(12) United States Patent
Walters et al.

(10) Patent No.: US 10,599,550 B2
(45) Date of Patent: *Mar. 24, 2020

(54) SYSTEMS AND METHODS TO IDENTIFY BREAKING APPLICATION PROGRAM INTERFACE CHANGES

(71) Applicant: CAPITAL ONE SERVICES, LLC, McLean, VA (US)

(72) Inventors: Austin Walters, Savoy, IL (US);
Jeremy Goodsitt, Champaign, IL (US);
Vincent Pham, Champaign, IL (US);
Kate Key, Effingham, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/457,548

(22) Filed: Jun. 28, 2019

(65) Prior Publication Data

US 2020/0012583 A1 Jan. 9, 2020

Related U.S. Application Data

(63) Continuation of application No. 16/362,466, filed on Mar. 22, 2019, now Pat. No. 10,379,995.
(Continued)

(51) Int. Cl.
*G06F 9/44* (2018.01)
*G06F 11/36* (2006.01)
(Continued)

(52) U.S. Cl.
CPC ............ *G06F 11/3608* (2013.01); *G06F 9/54* (2013.01); *G06F 11/3636* (2013.01); *G06N 20/00* (2019.01)

(58) Field of Classification Search
CPC ........................................................ G06F 9/44
See application file for complete search history.

(56) References Cited

U.S. PATENT DOCUMENTS 5,911,139 A 6/1999 Jain
5,974,549 A 10/1999 Golan
(Continued)

OTHER PUBLICATIONS

Beaulieu-Jones et al., Privacy-preserving generative deep neural networks support 1 clinical data sharing, Jul. 5, 2017, bioRxiv, total pp. 40, http://dx.doi.org/10.1101/159756 (Year: 2017).
(Continued)

*Primary Examiner* — Jae U Jeon
(74) *Attorney, Agent, or Firm* — Finnegan, Henderson, Farabow, Garrett & Dunner, LLP

(57) ABSTRACT

Systems and methods for managing Application Programming Interfaces (APIs) are disclosed. For example, the system may include one or more memory units storing instructions and one or more processors configured to execute the instructions to perform operations. The operations may include sending a first call to a first node-testing model associated with a first API and receiving a first model output comprising a first model result and a first model-result category. The operations may include identifying a second node-testing model associated with a second API and sending a second call to the second node testing model. The operations may include receiving a second model output comprising a second model result and a second model-result category. The operations may include performing at least one of sending a notification, generating an updated first node-testing model, generating an updated second node-testing model, generating an updated first call, or generating an updated second call.

19 Claims, 14 Drawing Sheets

Related U.S. Application Data

(60) Provisional application No. 62/694,968, filed on Jul. 6, 2018.

(51) Int. Cl.
*G06F 9/54* (2006.01)
*G06N 20/00* (2019.01)

(56) References Cited

U.S. PATENT DOCUMENTS

| | | | |
|---|---|---|---|
| 6,137,912 | A | 10/2000 | Kostrzewski et al. |
| 6,269,351 | B1 | 7/2001 | Black |
| 6,456,990 | B1 | 9/2002 | Hoffmann |
| 7,788,191 | B2 | 8/2010 | Jebara |
| 7,953,682 | B2 | 5/2011 | Smith |
| 8,375,014 | B1 | 2/2013 | Brocato |
| 8,375,032 | B2 | 2/2013 | Birdwell |
| 8,392,418 | B2 | 3/2013 | Birdwell |
| 8,484,215 | B2 | 7/2013 | Anderson |
| 8,548,951 | B2 | 10/2013 | Solmer |
| 8,706,659 | B1 | 4/2014 | Mann |
| 8,782,744 | B1 | 7/2014 | Fuller |
| 8,990,236 | B2 | 3/2015 | Mizrahy |
| 9,171,146 | B2 | 10/2015 | Vipat |
| 9,274,935 | B1 | 3/2016 | Lachwani |
| 9,462,013 | B1 | 10/2016 | Boss |
| 9,497,202 | B1 | 11/2016 | Calo |
| 9,608,809 | B1 | 3/2017 | Ghetti |
| 9,678,999 | B1 | 6/2017 | Gibas |
| 9,716,842 | B1 | 7/2017 | Worley |
| 9,754,190 | B1 | 9/2017 | Guttmann |
| 9,886,247 | B2 * | 2/2018 | Laredo ............... G06F 16/2455 |
| 9,912,698 | B1 | 3/2018 | Thioux |
| 9,954,893 | B1 | 4/2018 | Zhao |
| 1,012,296 | A1 | 11/2018 | Lim |
| 1,021,242 | A1 | 2/2019 | Trepte |
| 1,028,290 | A1 | 5/2019 | Miller |
| 10,453,220 | B1 | 10/2019 | Mihal et al. |
| 2002/0103793 | A1 | 8/2002 | Koller |
| 2003/0003861 | A1 | 1/2003 | Kagemoto |
| 2003/0074368 | A1 | 4/2003 | Schuetze |
| 2006/0031622 | A1 * | 2/2006 | Jardine ............... G06Q 10/00 710/310 |
| 2007/0169017 | A1 | 7/2007 | Coward |
| 2007/0271287 | A1 | 11/2007 | Acharya |
| 2008/0168339 | A1 | 7/2008 | Hudson |
| 2008/0270363 | A1 | 10/2008 | Hunt |
| 2008/0288889 | A1 | 11/2008 | Hunt |
| 2009/0055331 | A1 | 2/2009 | Stewart |
| 2009/0055477 | A1 | 2/2009 | Flesher |
| 2009/0110070 | A1 | 4/2009 | Takahashi et al. |
| 2009/0254971 | A1 | 10/2009 | Herz |
| 2010/0251340 | A1 | 9/2010 | Martin |
| 2010/0254627 | A1 | 10/2010 | Panahpour Tehrani et al. |
| 2010/0332210 | A1 | 12/2010 | Birdwell |
| 2010/0332474 | A1 | 12/2010 | Birdwell |
| 2012/0174224 | A1 | 7/2012 | Thomas |
| 2012/0284213 | A1 | 11/2012 | Lin |
| 2013/0117830 | A1 | 5/2013 | Erickson |
| 2013/0124526 | A1 | 5/2013 | Birdwell |
| 2013/0159309 | A1 | 6/2013 | Birdwell |
| 2013/0159310 | A1 | 6/2013 | Birdwell |
| 2013/0167192 | A1 | 6/2013 | Hickman |
| 2014/0053061 | A1 | 2/2014 | Chasen |
| 2014/0195466 | A1 | 7/2014 | Phillipps et al. |
| 2014/0201126 | A1 | 7/2014 | Zadeh |
| 2014/0278339 | A1 | 9/2014 | Aliferis |
| 2014/0324760 | A1 | 10/2014 | Marwah |
| 2014/0325662 | A1 | 10/2014 | Foster |
| 2014/0365549 | A1 * | 12/2014 | Jenkins ............... G06F 9/526 709/201 |
| 2015/0032761 | A1 | 1/2015 | Pasternack |
| 2015/0058388 | A1 | 2/2015 | Smigelski |
| 2015/0066793 | A1 | 3/2015 | Brown |
| 2015/0100537 | A1 | 4/2015 | Grieves |
| 2015/0220734 | A1 | 8/2015 | Nalluri |
| 2015/0241873 | A1 | 8/2015 | Goldenberg |
| 2015/0309987 | A1 | 10/2015 | Epstein |
| 2016/0019271 | A1 | 1/2016 | Ma |
| 2016/0057107 | A1 | 2/2016 | Call |
| 2016/0092476 | A1 | 3/2016 | Stojanovic |
| 2016/0092557 | A1 | 3/2016 | Stojanovic |
| 2016/0110657 | A1 | 4/2016 | Gibiansky |
| 2016/0119377 | A1 | 4/2016 | Goldberg |
| 2016/0132787 | A1 | 5/2016 | Drevo |
| 2016/0162688 | A1 | 6/2016 | Call |
| 2016/0197803 | A1 | 7/2016 | Talbot |
| 2016/0308900 | A1 | 10/2016 | Sadika |
| 2016/0371601 | A1 | 12/2016 | Grove |
| 2017/0011105 | A1 | 1/2017 | Shet |
| 2017/0083990 | A1 | 3/2017 | Hou |
| 2017/0134405 | A1 | 5/2017 | Ahmadzadeh et al. |
| 2017/0147930 | A1 | 5/2017 | Bellala |
| 2017/0220336 | A1 * | 8/2017 | Chen ............... G06F 8/36 |
| 2017/0236183 | A1 | 8/2017 | Klien et al. |
| 2017/0249432 | A1 | 8/2017 | Grantcharov |
| 2017/0331858 | A1 | 11/2017 | Clark, III |
| 2017/0359570 | A1 | 12/2017 | Holzer |
| 2018/0018590 | A1 | 1/2018 | Szeto |
| 2018/0108149 | A1 | 4/2018 | Levinshtein |
| 2018/0115706 | A1 | 4/2018 | Kang et al. |
| 2018/0150548 | A1 | 5/2018 | Shah |
| 2018/0165475 | A1 | 6/2018 | Veeramachaneni et al. |
| 2018/0165728 | A1 | 6/2018 | McDonald |
| 2018/0173730 | A1 | 6/2018 | Copenhaver |
| 2018/0173958 | A1 | 6/2018 | Hu et al. |
| 2018/0181802 | A1 | 6/2018 | Chen |
| 2018/0198602 | A1 | 7/2018 | Duffy |
| 2018/0199066 | A1 | 7/2018 | Ross et al. |
| 2018/0204111 | A1 | 7/2018 | Zadeh |
| 2018/0240041 | A1 | 8/2018 | Koch |
| 2018/0248827 | A1 | 8/2018 | Scharber |
| 2018/0253894 | A1 | 9/2018 | Krishnan |
| 2018/0260474 | A1 | 9/2018 | Surdeanu |
| 2018/0260704 | A1 | 9/2018 | Sun |
| 2018/0268286 | A1 | 9/2018 | Dasgupta |
| 2018/0307978 | A1 | 10/2018 | Ar |
| 2018/0336463 | A1 | 11/2018 | Bloom |
| 2018/0367484 | A1 | 12/2018 | Rodriguez |
| 2008/9001896 | A1 | 1/2019 | Hunt |
| 2019/0005657 | A1 | 1/2019 | Gao |
| 2019/0026956 | A1 | 1/2019 | Gausebeck |
| 2019/0034833 | A1 | 1/2019 | Ding |
| 2019/0042290 | A1 | 2/2019 | Bailey |
| 2019/0051051 | A1 | 2/2019 | Kaufman |
| 2019/0057509 | A1 | 2/2019 | Lv |
| 2019/0147371 | A1 | 5/2019 | Deo |
| 2019/0196600 | A1 | 6/2019 | Rothberg |
| 2019/0220653 | A1 | 7/2019 | Wang |

OTHER PUBLICATIONS

Brkic et al., I Know That Person: Generative Full Body and Face De-Identification of People in Images, 2017 IEEE Conference on Computer Vision and Pattern Recognition Workshops, pp. 1319-1328 (Year: 2017).

C. Willems, T. Holz and F. Freiling, "Toward Automated Dynamic Malware Analysis Using CWSandbox," in IEEE Security & Privacy, vol. 5, No. 2, pp. 32-39, Mar.-Apr. 2007. (Year: 2007).

Dernoncourt, F., Lee, J. Y., Uzuner, O., & Szolovits, P. (2017). De-identification of patient notes with recurrent neural networks. Journal of the American Medical Informatics Association, 24(3), 596-606. (Year: 2017).

Domadia, S. G., & Zaveri, T. (May 2011). Comparative analysis of unsupervised and supervised image classification techniques. In Proceeding of National Conference on Recent Trends in Engineering & Technology (pp. 1-5). (Year: 2011).

Escovedo, Tatiana, et al. "DetectA: abrupt concept drift detection in non-stationary environments." Applied Soft Computing 62 (2017): 119-133. (Year: 2017).

(56) References Cited

OTHER PUBLICATIONS

Gidaris, S., & Komodakis, N. (2017). Detect, replace, refine: Deep structured prediction for pixel wise labeling. In Proceedings of the IEEE Conference on Computer Vision and Pattern Recognition (pp. 5248-5257). (Year: 2017).

Hasegawa et al. Interoperability for Mobile Agents by Incarnation Agents. AAMAS'03 Jul. 14-18, 2003, Melbourne, Australia. (Year: 2003).

Jiang, Z., Zhao, C., He, B., Guan, Y., & Jiang, J. (2017). De-identification of medical records using conditional random fields and long short-term memory networks. Journal of biomedical informatics, 75, S43-S53. (Year: 2017).

Kim, Yoon. "Convolutional neural networks for sentence classification." arXiv preprint arXiv: 1408. 5882 (2014). (Year: 2014).

Laszlo, M., & Mukherjee, S. (2013). Optimal univariate microaggregation with data suppression. Journal of Systems and Software, 86(3), 677-682. (Year: 2013).

Malekzadeh et al., Replacement Auto Encoder: A Privacy-Preserving Algorithm for Sensory Data Analysis, 2018 IEEE/ACM Third International Conference on Internet-of-Things Design and Implementation, pp. 166-176 (Year: 2018).

Marc Aurelio Ranzato, Arthur Szlam, Joan Bruna, Michael Mathieu, Ronan Collobert, and Sumit Chopra, "Video (Language) Modeling: A Baseline for Generative Models of Natural Videos", Article, May 4, 2016, 15 pages, Courant Institute of Mathematical Sciences.

Matthias Feurer, Jost Tobias Springenberg, Aaron Klein, Manuel Blum, Katharina Eggensperger, and Frank Nutter, "Efficient and Robust Automated Machine Learning", Advances in Neural Information Processing Systems 28 (Dec. 2015) HTTP://papers.nips.cc/pa.

Park et al., Data Synthesis based on Generative Adversarial Networks, Aug. 2018, Proceedings of the VLDB Endowment, vol. 11, No. 10, pp. 1071-1083 (Year: 2018).

Qin Gao, Will Lewis, Chris Quirk, and Mei-Yuh Hwang. 2011. Incremental training and intentional over-fitting of word alignment. In Proceedings of MT Summit XIII. (Year: 2011).

Roberts, Mike. "Serverless Architectures". https://martinfowler.com/articles/serverless.html. May 22, 2018. Accessed Jul. 22, 2019. (Year: 2018).

Vendrick, Carl, Hamed Pirsiavash, and Antonio Torralba. "Generating videos with scene dynamics." Advances in Neural Information Processing Systems. 2016 (Year: 2016).

Wiktionary. "Spin Up". https://en.wiktionary.org/w/index.php?title=spin_up&oldid=49727714. Jun. 15, 2018. Accessed Jul. 19, 2019. (Year: 2018).

Xue, Tianfan, etal. "Visual dynamics: Probabilistic future frame synthesis via cross convolutional networks." Advances in Neural Information Processing Systems. 2016 (Year: 2016).

\* cited by examiner

SYSTEMS AND METHODS TO IDENTIFY BREAKING APPLICATION PROGRAM INTERFACE CHANGES

CROSS REFERENCE TO RELATED APPLICATIONS

This application is a continuation of application Ser. No. 16/362,466 (now allowed), filed Mar. 22, 2019, which claims the benefit of U.S. Provisional Application No. 62/694,968, filed Jul. 6, 2018 The aforementioned applications are expressly incorporated herein by reference in their entireties.

This application relates to U.S. patent application Ser. No. 16/151,385 filed on Oct. 4, 2018, and titled Data Model Generation Using Generative Adversarial Networks. This application also relates to U.S. application Ser. No. 16/362,537 filed Mar. 22, 2019 and titled Automated Honeypot Creation Within a Network. In addition, this application relates to U.S. application Ser. No. 16/362,568 filed Mar. 22, 2019 and titled Systems and Methods to Manage Application Program Interface Communications. The disclosures of the aforementioned applications are expressly incorporated herein by reference in their entirety.

BACKGROUND

Developers have a need to create and/or manage complicated systems that include large numbers of Application Program Interfaces (APIs) that receive high call volume. For example, dozens, hundreds, or more connected APIs may receive millions, billions, or more calls per day.

In a system, an API call may result in API node output that is passed to downstream API nodes. Thus, a single API call may trigger dozens, hundreds, or even more downstream API calls. Often, the routing pathways that API calls take through a set of nodes may be unknown or difficult to predict, owing to the complexity of the API system and the customizable nature of API calls. Further, node output from one API may be incompatible with another API, resulting in errors, failures, breakpoints, and other problems that prevent a system from successfully processing an API call. This creates challenges for developers, who may be unable to develop a system that can handle some API calls that the system receives.

Developers have limited tools for testing APIs during production. Typically, testing consists of passing actual or synthetic API calls to API nodes to identify and predict possible break points. This method of testing may be inefficient and consume large quantities of computing resources because APIs are often running. This method may also require a high degree of human oversight to generate and monitor tests. Further, problems may go unidentified and undetected until APIs are released and actual API calls trigger errors.

Therefore, in view of the shortcomings and problems with conventional approaches to training models, there is a need for efficient, unconventional systems that identify problems with API systems.

SUMMARY

The disclosed embodiments provide unconventional methods and systems for managing APIs. The disclosed systems and methods may be implemented using a combination of conventional hardware and software as well as specialized hardware and software, such as a machine constructed and/or programmed specifically for performing functions associated with the disclosed method steps.

Consistent with the present embodiments, there is provided a system for managing APIs. The system may include one or more memory units storing instructions and one or more processors configured to execute the instructions to perform operations. The operations may include sending a first call to a first node-testing model associated with a first API and receiving from the first node-testing model, a first model output based on the first call. The first model output may include a first model result and a first model-result category. The operations may include identifying a second node-testing model associated with a second API and sending a second call to the second node-testing model, the second call being based on the first model result. The operations may include receiving, from the second node-testing model, a second model output based on the second call. The second model output may include a second model result and a second model-result category. The operations may include performing at least one of: sending a notification to a device based on at least one of the first model result, the first model-result category, the second model result, or the second model-result category; generating an updated first node-testing model based on the first node-testing model; generating an updated second node-testing model based on the second node-testing model; generating an updated first call; or generating an updated second call.

Consistent with the present embodiments, a method for managing APIs is disclosed. The method may include sending a first call to a first node-testing model associated with a first API and receiving from the first node-testing model, a first model output based on the first call. The first model output may include a first model result and a first model-result category. The method may include identifying a second node-testing model associated with a second API and sending a second call to the second node-testing model, the second call being based on the first model result. The method may include receiving, from the second node-testing model, a second model output based on the second call. The second model output may include a second model result and a second model-result category. The method may include performing at least one of: sending a notification to a device based on at least one of the first model result, the first model-result category, the second model result, or the second model-result category; generating an updated first node-testing model based on the first node-testing model; generating an updated second node-testing model based on the second node-testing model; generating an updated first call; or generating an updated second call.

Consistent with other disclosed embodiments, non-transitory computer readable storage media may store program instructions, which are executed by at least one processor device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Disclosed embodiments improve API management by identifying and improving API call errors, API routing, API versioning, and unauthorized API access. APIs of the embodiments may include remote APIs (web-based, cloud-based, or server-based APIs) and/or local APIs (APIs hosted on a local machine or local network). In the embodiments, APIs may include communication protocols and one or more software or programming libraries. The embodiments provide unconventional systems and methods for training models to test API nodes, translate API calls between API versions, and imitate API nodes. These systems and methods may be used to facilitate effective communication between APIs of different versions, that otherwise may be unable to effectively communicate. An API version may be a set of rules or parameters associated with a particular release date, which an API uses to operate. An API call may be configured for one version of an API, and a second version of the API may be unable to produce API output based on the API call or may produce an error. Further, the embodiments may provide unconventional systems and methods for profiling and clustering datasets, identifying dataset similarities, or identifying data lineage.

Systems and methods of disclosed embodiments may involve datasets comprising actual data reflecting real-world conditions, events, or measurement. However, in some embodiments, disclosed systems and methods may fully or partially involve synthetic data (e.g., anonymized actual data or fake data). Datasets of disclosed embodiments may have a respective data schema (i.e., structure), including a data type, key-value pair, label, metadata, field, relationship, view, index, package, procedure, function, trigger, sequence, synonym, link, directory, queue, or the like. Datasets of the embodiments may contain foreign keys, i.e. data elements that appear in multiple datasets and may be used to cross-reference data and determine relationships between datasets. Foreign keys may be unique (e.g., a personal identifier) or shared (e.g., a postal code). Datasets of the embodiments may be "clustered," i.e., a group of datasets may share common features, such as overlapping data, shared statistical properties). Clustered datasets may share hierarchical relationships (i.e., data lineage).

Reference will now be made in detail to exemplary embodiments, examples of which are illustrated in the accompanying drawings and disclosed herein. Wherever convenient, the same reference numbers will be used throughout the drawings to refer to the same or like parts. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Figure 1:
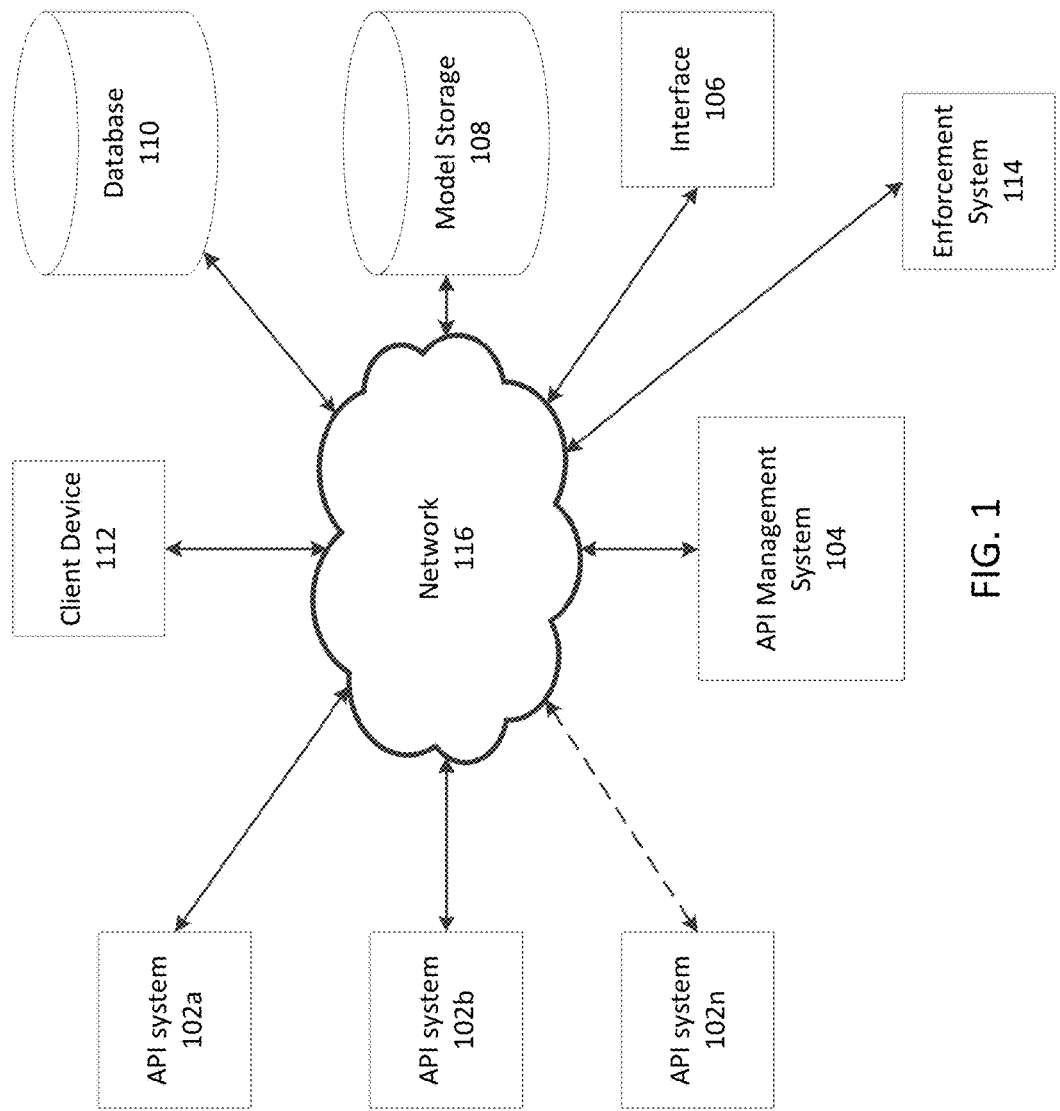
FIG. 1 is a diagram of an exemplary system for managing APIs, consistent with disclosed embodiments.

FIG. 1 is a diagram of exemplary system 100 to manage APIs, consistent with disclosed embodiments. As shown, system 100 may include API systems 102a, 102b, 102n, an API management system 104, an interface 106, a model storage 108, a database 110, a client device 112, and an enforcement system 114. Components of system 100 may be connected to each other through a network 114.

In some embodiments, aspects of system 100 may be implemented on one or more cloud services designed to generate ("spin-up") one or more ephemeral container instances in response to event triggers, assign one or more tasks to a container instance, and terminate ("spin-down") a container instance upon completion of a task. By implementing methods using cloud services, disclosed systems efficiently provision resources based on demand and provide security advantages because the ephemeral container instances may be closed and destroyed upon completion of a task. That is, the container instances do not permit access from outside using terminals or remote shell tools like SSH, RTP, FTP, or CURL, for example. Further, terminating container instances may include destroying data, thereby protecting sensitive data. Destroying data can provide security advantages because it may involve permanently deleting data (e.g., overwriting data) and associated file pointers.

As will be appreciated by one skilled in the art, the components of system 100 can be arranged in various ways and implemented with any suitable combination of hardware, firmware, and/or software, as applicable. For example, as compared to the depiction in FIG. 1, system 100 may include a larger or smaller number of client devices, interfaces, model optimizers, model storages, and databases. In addition, system 100 may further include other components or devices not depicted that perform or assist in the performance of one or more processes, consistent with the disclosed embodiments. The exemplary components and arrangements shown in FIG. 1 are not intended to limit the disclosed embodiments.

API systems 102a, 102b, 102n may include remote APIs (web-based, cloud-based, or server-based APIs) connected to system 100 via one or more networks (e.g., via network 116) and/or local APIs (APIs hosted on a local machine or local network of system 100). API systems may include a function, a microservice, subroutine, or another component of an API system. API systems 102a, 102b, 102n may include communication protocols and one or more software or programming libraries. API systems 102a, 102b, 102n are configured to receive input (API calls) and return API output in response to the calls. In some embodiments, one or more of API systems 102a, 102b, 102n are stand-alone API platforms that may include a plurality of subroutines handled by a plurality of API nodes. In some embodiments, two or more API systems 102a, 102b, 102n are components of the same API platform and operate as API nodes. In some embodiments, API systems 102a, 102b, 102n are configured to send calls to other API systems or nodes of system 100 and receive API output in response (e.g., API system 102a may send a call to API system 102b and receive a response in return). Calls between API systems 102a, 102b, 102n and calls within API systems 102a, 102b, 102n may be routed by API management system 104.

API management system 104 may include one or more computing systems configured to manage training of models for system 100 and route API calls, consistent with disclosed embodiments. API management system 104 can be configured to receive API calls, models, and/or datasets from other components of system 100 or other components not shown (e.g., via interface 106). API management system 104 may be configured to train and implement models, including machine learning models. API management system 104 may be configured to generate models. In some embodiments, API management system 104 is configured to export models to other components of system 100 and/or to external systems or devices (e.g., client device 112). API management system 104 is disclosed in greater detail, below (in reference to FIG. 3).

Interface 106 can be configured to manage interactions between system 100 and other systems using network 116. In some aspects, interface 106 can be configured to publish data received from other components of system 100. This data can be published in a publication and subscription framework (e.g., using APACHE KAFKA), through a network socket, in response to queries from other systems, or using other known methods. The data can be synthetic data, as described herein. As an additional example, interface 106 can be configured to provide information received from model storage 108 regarding available datasets. In various aspects, interface 106 can be configured to provide data or instructions received from other systems to components of system 100. For example, interface 106 can be configured to receive instructions for generating data models (e.g., type of data model, data model parameters, training data indicators, training hyperparameters, or the like) from another system and provide this information to model optimizer 104. As an additional example, interface 106 can be configured to receive data including sensitive portions from another system (e.g. in a file, a message in a publication and subscription framework, a network socket, or the like) and provide that components of system 100.

System 100 may include model storage 108. In some embodiments, some or all components of model storage 108 may be hosted on one or more servers, one or more clusters of servers, or one or more cloud services. Model storage 108 may be connected to network 116 and may additionally be directly connected to API management system 104 (connection not shown). In some embodiments, model storage 108 is a component of API management system 104 or client device 112 (not shown).

Model storage 108 can include one or more databases configured to store data models (e.g., machine-learning models or statistical models) and descriptive information of the data models. Model storage 108 can be configured to provide information regarding available data models to a user or another system. The databases can include cloud-based databases, cloud-based buckets, or on-premises databases. The information can include model information, such as the type and/or purpose of the model and any measures of classification error. Model storage 108 can include one or more databases configured to store indexed and clustered models for use by system 100. For example, model storage 108 may store models associated with generalized representations of those models (e.g., neural network architectures stored in TENSORFLOW or other standardized formats). The databases can include cloud-based databases (e.g., AMAZON WEB SERVICES S3 buckets) or on-premises databases.

Database 110 can include one or more databases configured to store data for use by system 100. The databases can include cloud-based databases (e.g., AMAZON WEB SERVICES S3 buckets) or on-premises databases. Database 110 can include one or more databases configured to store indexed and clustered models for use by system 100, as described above.

Client device 112 may include one or more memory units and one or more processors configured to perform operations consistent with disclosed embodiments. In some embodiments, client device 112 may include hardware, software, and/or firmware modules. Client device 112 may be a terminal, a kiosk, a mobile device, a tablet, a personal computer, a server, a server cluster, a cloud service, a storage device, or a specialized device configured to perform methods according to disclosed embodiments, or the like.

Enforcement system 114 may include a server including one or more memory units and one or more processors configured to perform operations consistent with disclosed embodiments. In some embodiments, enforcement system 114 may be configured to track and/or report malicious network activity. For example, enforcement system 114 may report to or be a component of a government agency (e.g., a cybercrimes agency) and/or an organization that tracks malware, hackers, or the like. In some embodiments, enforcement system 114 may be a component of API management system 104 (not shown). In some embodiments, enforcement system 114 may be managed by a government agency, a nonprofit agency, a private organization, or another organization.

Network 116 may be a public network or private network and may include, for example, a wired or wireless network, including, without limitation, a Local Area Network, a Wide Area Network, a Metropolitan Area Network, an IEEE 1002.11 wireless network (e.g., "Wi-Fi"), a network of networks (e.g., the Internet), a land-line telephone network, or the like. Network 116 may be connected to other networks, not depicted, to connect the various system components to each other and/or to external systems or devices. In some embodiments, network 116 may be a secure network and require a password to access the network.

Figure 2A:
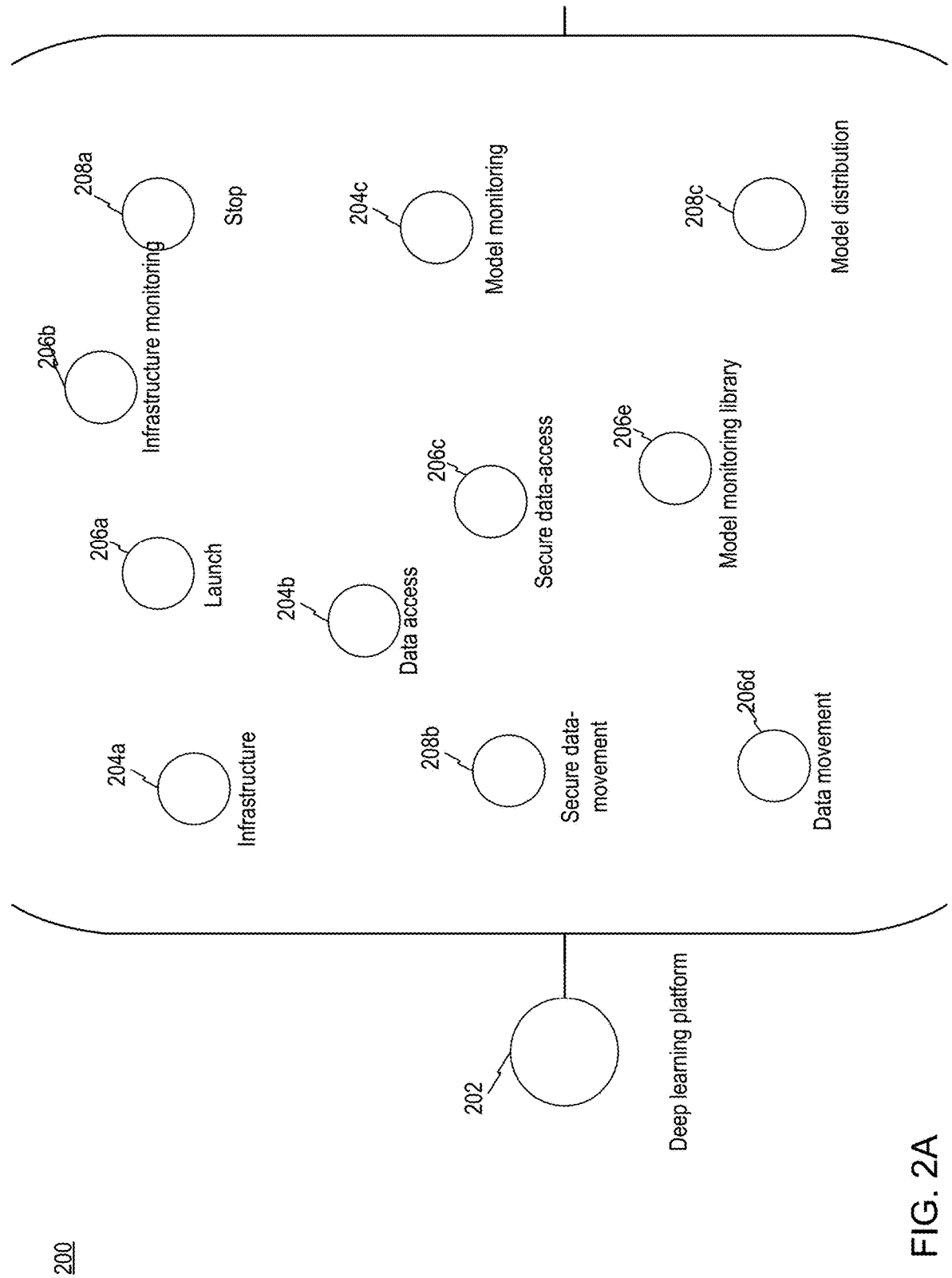
FIG. 2A is an illustration of an exemplary interface, consistent with disclosed embodiments.

FIG. 2A is an illustration of exemplary interface 200, consistent with disclosed embodiments. In some embodiments, the interface is displayed at one of interface 106, API management system 104, client device 112, or other component of system 100.

As shown, interface 200 may include a graphical representation of a deep learning platform node-testing model 202. A node-testing model may be a model that simulates (imitates) a corresponding API node by producing model output that simulates API output in response to an API call, consistent with disclosed embodiments. In some embodiments, a node-testing model may be a machine learning model, such as a sequence-to-sequence model (seq2seq), which may be implemented using one or more of a recurrent neural network mode (RNN), a long-short term memory (LSTM) model, convolutional neural network (CNN), or another neural network model. In some embodiments, the node testing model may include a synthetic data generation model or may be configured to implement a synthetic data generation model. For example, a generative adversarial network (GAN), a variational auto encoder, or any of the other neural networks previously mentioned may be implemented to generate synthetic data. In some embodiments, a node testing model is trained using API output data and call data to simulate API output. Call data may include actual or simulated API calls. An API node may be an API system (e.g., one of API system 102a, 102b, 102n) or a component of an API system (e.g., a function, a microservice, subroutine, or other component of an API system).

In some embodiments, deep learning platform node-testing model 202 may include a plurality of component node-testing models, including infrastructure node-testing model 204a, data access node-testing model 204b, model monitoring node-testing model 204c, launch node-testing model 206a infrastructure monitoring node-testing model 206b, Secure data-access node-testing model 206c, data movement node-testing model 206d, model monitoring library node-testing model 206e, stop node-testing model 208a secure data-movement node-testing model 208b, and/or model distribution node-testing model 208c. As shown, interface 200 may depict deep learning platform node-testing model 202 and the component node-testing models as discs. Node-testing models of FIG. 2A are depicted for purposes of illustration only, and, as one of skill in the art will appreciate, interface 200 may include additional, fewer, or different node-testing models.

In some embodiments, deep learning platform node-testing model 202 and the component node-testing models are configured to receive calls and return model output, consistent with disclosed embodiments. As shown in FIG. 2A, the component node-testing models may be presented as an unstructured system, with no known relationships between them. That is, routing pathways that calls may take as they are passed from deep learning platform node-testing model 202 to component node-testing models may be unknown. In addition, although node-testing models depicted in FIG. 2A have labels that may describe a function that the corresponding API node is configured to perform (e.g., "secure data-movement"), user-interface 200 may display node-testing models as unlabeled node-testing models or as labels that do not describe a function (e.g., "model 1", "model A", etc.).

Figure 2B:
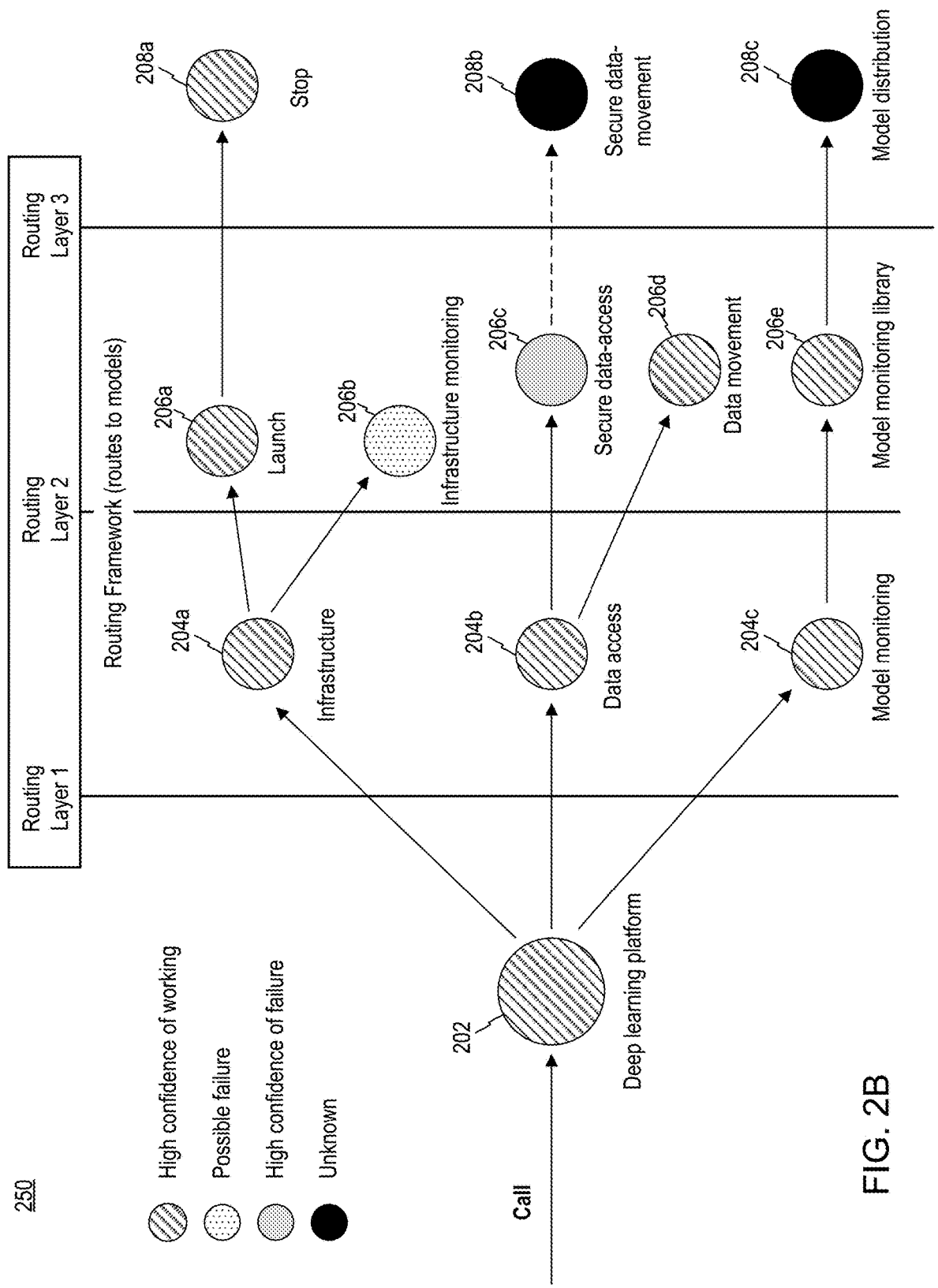
FIG. 2B is an illustration of an exemplary interface, consistent with disclosed embodiments.

FIG. 2B is an illustration of exemplary interface 250, consistent with disclosed embodiments. In some embodiments, the interface is displayed at one of interface 106, API management system 104, client device 112, or other component of system 100. As shown, interface 200 may include a graphical representation of a deep learning platform node-testing model 202. Interface 250 may display a structured arrangement of component node-testing models as described above in relation to interface 200. In the example of interface 250, component node-testing models are arranged according to routing pathways and routing layers, with arrows representing routing pathways of calls and model output to downstream node-testing models. As one of skill in the art will appreciate, interface 200 may include additional, fewer, or different node-testing models, routing layers, and/or routing pathways.

As shown in FIG. 2B, a call to deep learning platform node-testing model 202 may produce one or more node-testing model outputs that are routed downstream to destination node-testing models in a routing layer 1 that includes the node-testing models including infrastructure node-testing model 204a, data access node-testing model 204b, and model monitoring node-testing model 204c. Node-testing models of routing layer 1 may produce one or more model output and pass the model outputs to one or more node-testing models of a routing layer 2. For example, infrastructure node-testing model 204a may produce model output that is passed to launch node-testing model 206a and to infrastructure monitoring node-testing model 206b. Similarly, node-testing models of routing layer 2 may produce one or more model outputs and pass the model outputs to one or more node-testing models of a routing layer 3. For example, infrastructure monitoring node-testing model 206b may pass a model output to stop node-testing model 208a.

Interface 250 may display routing pathways and routing layers as determined by, for example, a routing table and/or a routing model, consistent with disclosed embodiments. For example, a routing table may include a list of calls and corresponding destination API nodes (or API node-testing models). A routing model may be trained on call data and API node output data to predict API node destinations, consistent with disclosed embodiments.

Interface 250 may be configured to display a model-result category associated with the node-testing model output. A model-result category may include a confidence level that a model result matches an API result. A model-result category may indicate a success, a warning, or failure of the call. In exemplary interface 250, model-result categories include "high confidence of working," "possible failure," "high confidence of failure," and "unknown." For example, "high confidence of working" may indicate a high likelihood that the node testing-model produces a model output which does not contain an error or warning. "Possible failure" may indicate low likelihood in the model output or may indicate that the model output may contain an error or warning. "High confidence of failure" may indicate high likelihood that the model output contains an error or warning. "Unknown" may indicate that the model is not configured to produce model output for a given call, that the likelihood of any particular model result is below a predetermined threshold, and/or that the result has an invalid or unknown data schema.

As described, interface 250 displays routing pathways, model-result categories. Accordingly, interface 250 identifies break points, errors, and can be used for managing APIs.

Figure 3:
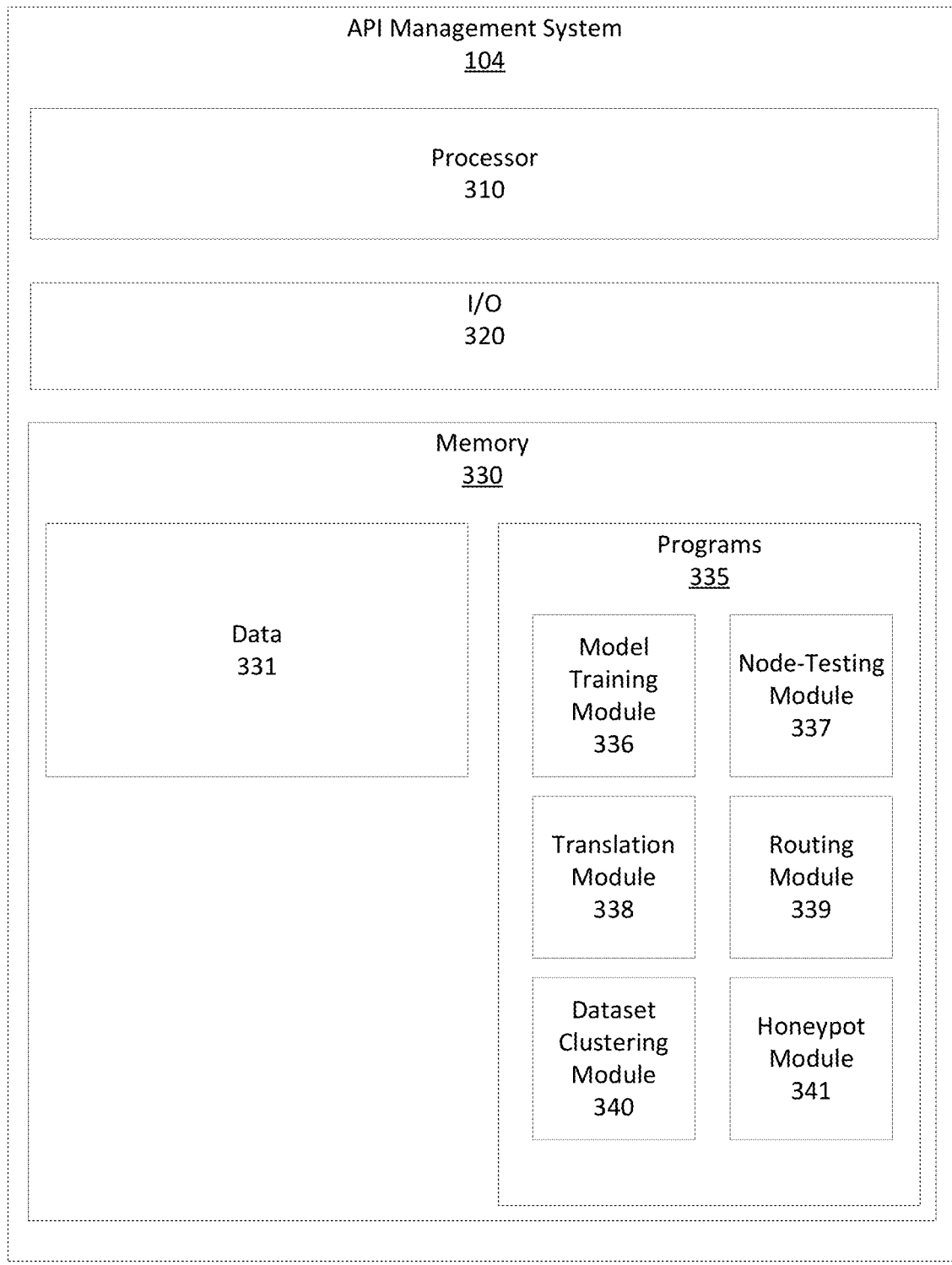
FIG. 3 depicts an exemplary API management system, consistent with disclosed embodiments.

FIG. 3 is an illustration of an exemplary API management system 104, consistent with disclosed embodiments. As shown, API management system 104 includes one or more processors 310, one or more I/O devices 320, and one or more memory units 330. In some embodiments, some or all components of API management system 104 may be hosted on a device, a computer, a server, a cluster of servers, or a cloud service. In some embodiments, API management system 104 is a scalable system configured to efficiently manage resources and enhance security by provisioning computing resources in response to triggering events and terminating resources after completing a task (e.g., a scalable cloud service that spins up and terminates container instances).

As depicted in FIG. 3, API management system 104 may include one or more processors 310, input/output units (I/O devices) 320, and one or more memory units 330. FIG. 3 is an exemplary configuration of API management system 104. As will be appreciated by one skilled in the art, the components and arrangement of components included in API management system 104 may vary. For example, as compared to the depiction in FIG. 3, API management system 104 may include a larger or smaller number of processors 310, I/O devices 320, or memory units 330. In addition, API management system 104 may further include other components or devices not depicted that perform or assist in the performance of one or more processes consistent with the disclosed embodiments. The components and arrangements shown in FIG. 3 are not intended to limit the disclosed embodiments, as the components used to implement the disclosed processes and features may vary.

Processor 310 may be known computing processors, including a microprocessor. Processor 310 may constitute a single-core or multiple-core processor that executes parallel processes simultaneously. For example, processor 310 may be a single-core processor configured with virtual processing technologies. In some embodiments, processor 310 may use logical processors to simultaneously execute and control multiple processes. Processor 310 may implement virtual machine technologies, or other known technologies to provide the ability to execute, control, run, manipulate, store, etc., multiple software processes, applications, programs, etc. In another embodiment, processor 310 may include a multiple-core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor(s) 310. Processor 310 may execute various instructions stored in memory 330 to perform various functions of the disclosed embodiments described in greater detail below. Processor 310 is configured to execute functions written in one or more known programming languages.

I/O devices 320 may include at least one of a display, an LED, a router, a touchscreen, a keyboard, a microphone, a speaker, a haptic device, a camera, a button, a dial, a switch, a knob, a transceiver, an input device, an output device, or another I/O device to perform methods of the disclosed embodiments. I/O devices 320 may be components of an interface of API management system 104 (e.g., an interface such as interface 106).

Referring again to FIG. 3, memory 330 may be a volatile or non-volatile, magnetic, semiconductor, optical, removable, non-removable, or other type of storage device or tangible (i.e., non-transitory) computer-readable medium, consistent with disclosed embodiments. As shown, memory 330 may include data 331, including of at least one of encrypted data or unencrypted data. Data 331 may include one or more model indexes, model parameters, model hyperparameters, model codes, dataset indexes, API routing tables, and/or datasets, consistent with disclosed embodiments.

Programs 335 may include one or more programs (e.g., modules, code, scripts, or functions) used to perform methods consistent with disclosed embodiments. Programs may include operating systems (not shown) that perform known operating system functions when executed by one or more processors. Disclosed embodiments may operate and function with computer systems running any type of operating system. Programs 335 may be written in one or more programming or scripting languages. One or more of such software sections or modules of memory 330 can be integrated into a computer system, non-transitory computer-readable media, or existing communications software. Programs 335 can also be implemented or replicated as firmware or circuit logic.

Programs 335 may include a model-training module 336, a node-testing module 337, a translation module 338, a routing module 339, a dataset clustering module 340, honeypot module 341, and/or other modules not depicted to perform methods of the disclosed embodiments. In some embodiments, modules of programs 335 may be configured to generate ("spin up") one or more ephemeral container instances to perform a task and/or to assign a task to a running (warm) container instance, consistent with disclosed embodiments. Modules of programs 335 may be configured to receive, retrieve, and/or generate models, consistent with disclosed embodiments. Modules of programs 335 may be configured to receive, retrieve, and/or generate datasets (e.g., to generate synthetic datasets, data samples, or other datasets), consistent with disclosed embodiments. Modules of programs 335 may be configured to perform operations in coordination with one another. For example, routing module 339 may send a model training request to model-training module 336 and receive a trained model in return, consistent with disclosed embodiments.

Model-training module 336 may be configured to train one or more models and/or perform hyperparameter tuning of one or more models, including machine learning models. For example, model-training module 336 can be configured to receive input of one or more thresholds, one or more loss functions, and/or one or more limits on a number of interactions and apply the input for optimizing a received model and/or corresponding generalized representation such as a neural network. In some embodiments, training of a model terminates when a training criterion is satisfied. In some embodiments, model-training module 336 is configured to adjust model parameters during training. The model parameters may include weights, coefficients, offsets, or the like. Training can be supervised or unsupervised.

Model-training module 336 can be configured to select or generate model parameters (e.g., number of layers for a neural network, kernel function for a kernel density estimator, or the like), update training hyperparameters, and evaluate model characteristics. For example, model characteristics may include a model type (e.g., an RNN, a convolutional neural network (CNN), a random forest, or another model type), a model parameter, a model hyperparameter (including training a hyperparameter and/or an architectural hyperparameter), a desired outcome, belongingness to a model cluster, and/or belongingness of a model training dataset to a dataset cluster, the similarity of synthetic data generated by a model to actual data, or other characteristics.

In some embodiments, model-training module 336 is configured to perform a search of a hyperparameter space and select new hyperparameters. This search may or may not depend on the values of a performance metric obtained for other trained models. In some aspects, model-training module 336 can be configured to perform a grid search or a random search. The hyperparameters can include training hyperparameters, which can affect how training of the model occurs, or architectural hyperparameters, which can affect the structure of the model.

Consistent with disclosed embodiments, hyperparameters can include training hyperparameters such as learning rate, batch size, number of training batches, number of epochs, chunk size, time window, input noise dimension, or the like. Hyperparameters can include architectural parameters such as number of layers in a neural network, the choice of activation function for a neural network node, the layers in a CNN or the like. For example, when the stored model comprises a generative adversarial network (GAN), training hyperparameters for the model can include a weight for a loss function penalty term that penalizes the generation of training data according to a similarity metric. As a further example, when the stored model comprises a neural network, the training hyperparameters can include a learning rate for the neural network. As an additional example, when the model is a CNN, architectural hyperparameters can include the number and type of layers in the convolutional neural network.

In some embodiments, model-training module 336 includes programs to apply one or more templates to a data model (e.g., a model retrieved from model storage 108) and apply the templates to generate a generalized representation of the retrieved model (e.g., a neural network). Model-training module 336 may include programs to provide trained generalized representations to model storage 108 for storing in association with corresponding models.

Node-testing module 337 may be configured to train models to test and/or imitate API nodes, consistent with disclosed embodiments. Node-testing module 337 may include or be configured to train and implement models in coordination with or independent from other modules of programs 335, consistent with disclosed embodiments. For example, node-testing module 337 may include or be configured to implement one or more node-testing models and/or one or more node-imitating models, consistent with disclosed embodiments. Node-testing models and/or node-imitating models may include machine learning models. In some embodiments, the machine learning models may include an RNN, a long-short term memory (LSTM) model, convolutional neural network (CNN), a seq2seq model, generative adversarial network (GAN), an autoencoder, a variational autoencoder, or another neural network model. The machine learning models may be trained using API call data (e.g., API calls, API outputs, and/or API identifiers) to receive API calls and generate model outputs that include model results match API call results. API identifiers may include a date or version number associated with an API, a source IP address, a destination IP address, and/or a schema to which an API call conforms. The model result may include a message (e.g., an error message or a warning message). In some embodiments, the models may be trained to generate model outputs that include one or more model-result categories. A model-result category may include a confidence level that a model result matches an API result. A model-result category may indicate a success, a warning, or failure of the call. In some embodiments, the machine learning models (e.g., node-testing models or node-imitating models) may be configured to retrieve API call data from a storage (e.g., data 331, database 110, or other data storage) for model training, API testing, or call processing. In some embodiments, the machine learning models may be configured to receive API call data as API nodes calls are received and processed by, for example, one or more API systems (e.g., API systems 102a, 102b, 102c). Node-testing module 337 and models of node-testing module 337 may be configured to receive and transmit data, including API call data, from and to other components of system 100 or from computing components outside system 100 (e.g., via interface 106).

Translation module 338 may be configured to translate a call (an input call) to a different call (i.e., a translated call). The input call may be associated with an API and/or a particular version of an API. Translation module 338 may be configured to translate any number of kinds of inputs. In some embodiments, the inputs to translation module 338 may be model outputs or API outputs, such as an API response produced by an API. The translated inputs may therefore also be translated outputs. These translated outputs may also be associated with an API and/or a particular version of an API. In some embodiments, translation module 338 may perform multiple translations on the same input.

In some embodiments, translation module 338 may be configured to receive an input from another module, such as routing module 339, another part of API Management System 104, or another device connected to Management System 104. This input may be an API call, API dataset, API response, or other code. Translation module 338 may determine certain characteristics about the input, such as an API version it corresponds to, a schema it follows, or a source IP address or destination IP address associated with it.

Translation module 338 may be configured to translate an input based on its characteristics. For example, if translation module 338 determines that the input is associated with a first version of an API, it may translate the input to a different input based on that version of an API. In some embodiments, translation module 338 may be configured to translate an input based on a first API node to which the input is being sent, and/or a second API node from which the input is sent. This translation may be based on characteristics of the first and/or second API node, such as a version of API running on the first and/or second API node, an identifier associated with the first and/or second API node, or attributes of the surroundings of the first and/or second API node. For example, if an input is being sent to a first node running a first version of an API, such as a newer or older version of an API relative to the version associated with the input, translation module 338 may translate the input into an input associated or compliant with the version of an API running on the first node. In this example, the first node may be called a destination API node, as it is the destination of a translated input or output.

In some embodiments, translation module 338 may be configured to translate an input, such as an API call, to a different input, without the use of a library or stored versions of an API. For example, translation module 338 may be configured by another module, such as model-training module 336, which may be a machine-learning model and/or a neural network. Machine-learning models of translation module 338 may include an RNN model. Translation module 338 may operate according to rules, which may be pre-programmed rules, rules learned through machine-learning, or a combination of both. In some embodiments, translation module 338 may be configured to generate, train, and/or implement translation models, which may be used to translate inputs.

Translation module 338 may also be configured to send a translated input to another module, such as routing module 339, another part of API Management System 104, or another device connected to Management System 104. In some embodiments, translation module 338 may send a translated input to another module for further processing. For example, translation module 338 may send a translated input to another translation module for further translation. In some embodiments, translation module 338 may send a translated input to a module or device that processes the input to produce a result. For example, translation module 338 may send an API call to an API that processes the API call to produce an API result responsive to the call.

Translation module 338 may also be configured to generate, train, and/or implement versioning models, which may be configured to determine an API associated with an input (e.g., an API call), consistent with disclosed embodiments. In some embodiments, the versioning model may be configured to associate an API version with a corresponding model (e.g., a translation model, a node-testing model, and/or a node-imitating model). In some embodiments, versioning models may be rule-based. For example, a versioning model may be configured to apply a table (e.g., lookup table) to determine an API version associated based on information associated with an API call (e.g., metadata, a header, an API identifier). In some embodiments, versioning models may be machine learning models trained to determine an API version using API call data, consistent with disclosed embodiments. For example, the versioning model may be trained to identify an API version based on data contained within or associated with an API call (e.g., based on API call syntax, commands (e.g., function calls), a data schema of a dataset, or other data).

Routing module 339 may be configured to identify routing pathways and/or to route calls between API nodes, consistent with disclosed embodiments. In some embodiments, routing module 339 is configured to receive a routing table from another component of system 100 or a computing component outside system 100 (e.g., via interface 106). In some embodiments, routing module 339 is configured to generate, train, and/or implement a versioning model, as previously described. In some embodiments, routing module 339 may be configured to retrieve a routing table from a storage (e.g., data 331, database 110, or other data storage). A routing table may include information specifying where to route an API call and/or where to route an API output. The routing table may include identifiers specifying API nodes. For example, the routing table may include information specifying that an API call (or API output) containing a first identifier should be routed to a first API node. The identifier may be an API address (IP address, domain name, or other address), an API name, an API version, an API function, or other identifier.

In some embodiments, routing module 339 may be configured to generate a routing table, consistent with disclosed embodiments. For example, routing module 339 may generate a routing table by extracting information in an API call specifying a routing pathway and generating or updating a routing table based on the extracted information. In some embodiments, routing module 339 may generate a routing table by creating a graph based on routing logs between nodes. In some embodiments, routing module 339 may be configured to train and implement a routing model. The routing model may include one or more machine-learning models. In some embodiments, the machine-learning models may include an RNN, a long-short term memory (LSTM) model, or another neural network model. The machine-learning models may be trained using API call data (e.g., API calls and/or API outputs) to predict a routing pathway based on the API call data. In some embodiments, the machine-learning models may be configured to retrieve API call data from a storage (e.g., data 331, database 110, or other data storage) for model training, API testing, or call processing. In some embodiments, the machine-learning models may be configured to receive API call data in real-time as API nodes calls are received and processed by, for example, one or more API systems (e.g., API systems 102a, 102b, 102c). Routing module 339 may be configured to receive and transmit data, including API call data, from and to other components of system 100 or from components outside system 100 (e.g., via interface 106).

Dataset-clustering module 340 may be configured to group, or "cluster," datasets, consistent with disclosed embodiments. Dataset-clustering module 340 may include or be configured to implement one or more data-profiling models. A data-profiling model may include machine-learning models and statistical models to determine the data schema and/or a statistical profile of a dataset (i.e., to profile a dataset), consistent with disclosed embodiments. The data-profiling model may include an RNN model, a CNN model, or other machine-learning model. The data-profiling model may include algorithms to determine a data type, key-value pairs, row-column data structure, statistical distributions of information such as keys or values, or other property of a data schema. The data-profiling model may be configured to implement univariate and multivariate statistical methods. The data-profiling model may include a regression model, a Bayesian model, a statistical model, a linear discriminant analysis model, or other classification model configured to determine one or more descriptive metrics of a dataset. For example, the data-profiling model may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

In some embodiments, the data-profiling models may be configured to return a statistical profile of a dataset. The statistical profile may include a plurality of descriptive metrics. For example, the statistical profile may include an average, a mean, a standard deviation, a range, a moment, a variance, a covariance, a covariance matrix or any other statistical metric of the selected dataset. In some embodiments, the statistical metric may be a similarity metric representing a measure of similarity between data in a dataset. The similarity metric may be based on a covariance matrix, a variance, a frequency of overlapping values, or other measure of statistical similarity.

Dataset-clustering module 340 may be configured to generate or implement a data-mapping model. A data-mapping model may include machine-learning models to generate edges between nodes, the nodes being datasets (i.e., cluster datasets, data mapping or data crawling). The data-mapping model may include at least one of an RNN model, a CNN model, a random forest model, a bag-of-words model, a multilayer perceptron model, a gated recurrent unit model, a seq2seq model, or other machine-learning model. An edge may comprise an indicator of a hierarchical relationship (e.g., a data lineage, parent-child relationship, derived data, an ambiguous hierarchy), and may include an overlap score indicating the amount of overlap between datasets.

In some embodiments, dataset-clustering module 340 may be configured to generate or retrieve a data-mapping model from a data storage (e.g., model storage 108). Dataset-clustering module 340 may identify and retrieve a data-mapping model based on a statistical profile, a data schema, a model index, and/or a model search strategy. Consistent with disclosed embodiments, the search strategy may include a random search or a grid search. In some embodiments, dataset-clustering module 340 may be configured to receive a plurality of datasets and retrieve a data-mapping model previously used to generate edge data for one of the received datasets. Dataset-clustering module 340 may be configured to retrieve a data-mapping module previously used for a dataset that share features of a data schema of one of the received datasets. In some aspects, dataset-clustering module 340 may be capable of retrieving a data-mapping model used for a dataset having a statistical similarity metric with one of the received datasets that meets a threshold criterion.

In some embodiments, the data-mapping model includes machine-learning models or other models to identify foreign keys and maintain an index of foreign keys (e.g., a data crawler model). The foreign keys may be unique or shared, consistent with disclosed embodiments. The foreign keys may be stored in, for example, foreign database 110 and/or data 331. The data-mapping model may be configured to predict foreign keys by identifying candidate foreign keys and determining a foreign key score based on at least one of an index of foreign keys or a search of a dataset. For example, the data-mapping model may be configured to determine a foreign key score based on a frequency of occurrence of a candidate foreign key in one or more datasets or based on a label associated with the candidate foreign key. As another example, the data-mapping model may be capable of assigning a foreign key score to a candidate foreign key based on its occurrence in a data column that includes known foreign keys.

The data-mapping model of dataset-clustering module 340 may be configured to connect datasets (i.e., generate edges between datasets) based on at least one of a foreign key, a data schema, or a similarity metric. Edge data may include information indicating a similarity between datasets (e.g., a measure of data overlap, correlation, covariance, or other measure of statistical similarity) or a hierarchical relationship (e.g., derived data, parent-child relationships). The data-mapping model may be configured to receive a plurality of datasets and generate edges based solely on the received datasets. In some embodiments, the data-mapping model may be configured to receive a plurality of datasets and generate edges based on the received datasets and on stored, clustered datasets.

Clustering module 340 may include or be configured to implement a data-classification model. The data-classification model may include machine-learning models to classify datasets based on the data schema, statistical profile, foreign keys, and/or edges. The data-classification model may be configured to segment datasets, consistent with disclosed embodiments. Segmenting may include classifying some or all data within a dataset, marking or labeling data (e.g., as duplicate), cleaning a dataset, formatting a dataset, or eliminating some or all data within a dataset based on classification. The models may be configured to classify data elements as actual data, synthetic data, relevant data for an analysis goal or topic, data derived from another dataset, or any other data category. The data-classification model may include a CNN, a random forest model, an RNN model, a support vector machine model, or another machine-learning model.

Honeypot module 341 may be configured to implement a honeypot computer security mechanism. In some embodiments, honeypot module 341 may be configured to automatically generate and implement honeypots in response to detected malicious actors. That is, honeypot module 341 may be configured to detect an unauthorized API call and provide, in response, synthetic data that appears to be real API output. After an unauthorized call is detected, API management system 104 may continue to route legitimate or authorized calls to API nodes, or to generate new API nodes to manage legitimate calls (e.g., a secondary live system). Honeypot module 341 may include or be configured to train and implement models in coordination with or independent from other modules of programs 335, consistent with disclosed embodiments.

In some embodiments, honeypot module 341 is configured to receive, retrieve, and/or generate a node-imitating model, consistent with disclosed embodiments. Model output of the node-imitating model may appear to be real API output to an unauthorized user (i.e., the model may be a component of a honeypot computer-security system mechanism). Generating and/or training a node-imitating model may be based on data received or retrieved from a model storage, including one or more models, model characteristics, and/or training criteria. A node-imitating model may be configured to retrieve and/or receive data (e.g., from database 110), including one or more datasets. In some embodiments, training a node-imitating model may include receiving a node-testing model from a data storage (e.g., model storage 108) and training the node-testing model.

Honeypot module 341 may train a node-imitating model to generate model output based on API output. In some embodiments, the API management system 104 trains node-imitating model 1022 until one or more training criteria are satisfied, consistent with disclosed embodiments.

In some embodiments, training a node-imitating model to generate model output includes training the model to generate synthetic data. For example, a node-imitating model may be trained to generate synthetic data that has a data profile that, when compared to API output data, satisfies a similarity metric, consistent with disclosed embodiments. In some embodiments, generating synthetic data includes adjusting API output by adding noise. In some embodiments, generating synthetic data includes altering a data schema of API output data (e.g., switching data labels or otherwise relabeling data). In some embodiments, generating synthetic data includes replacing data in API output with synthetic data. For example, a node-imitating model may be trained to identify sensitive information (e.g., account numbers, social security numbers, names, addresses, API keys, network or IP addresses, or the like) and replace sensitive information with non-sensitive information having similar properties (e.g., identifying a 16-digit account number and replacing it with a fake 16-digit account number).

In some embodiments, model output of a node-imitating model may include a data marker. The data marker may include one or more data elements (e.g. a string or a number). A data marker may be randomly generated. A data marker may include a Universally Unique Identifier (UUID). In some embodiments, honeypot module 341 is configured to store a data marker. In some embodiments, the data marker is associated with an API call, a location, an API node, a node-testing model (e.g., data marker may be stored in a relational database). In some embodiments, honeypot module 341 is configured to receive a dataset and determine whether the dataset includes a data marker. Determine whether the dataset includes a data marker may include comparing the dataset to a stored data marker.

In some embodiments, API management system 104 may train a node-imitating model to generate model output having a predetermined data profile. For example, the predetermined data profile may be based on one or more data markers (e.g., the node-imitating model may generate data with two data markers having a predetermined covariance between data columns). The predetermined data profile may be unique to the model output, such that the appearance of the predetermined data profile confirms that the data to which the profile is attached is the model output. In some embodiments, the predetermined data profile may use token keys to determine whether received data matches a previous model output. API management system 104 may retain token keys to confirm an instance of model output.

In some embodiments, honeypot module 341 is configured to determine a suspiciousness score of the data. In some embodiments, the suspiciousness score is a likelihood that data derives from API calls to an API node (e.g. API systems 102a, 102b, 102n or their components) and/or API management system 104. In some embodiments, the suspiciousness score may be a number (e.g., 0-100) or a category (e.g., highly, medium, low). In some embodiments, the suspiciousness score is based on detecting a data marker. For example, the suspiciousness score may be based on a frequency of a data marker in a dataset.

In some embodiments, honeypot module 341 is configured to determine a suspiciousness score based on a data profile. For example, honeypot module 341 may determine a similarity metric of a data profile and a data profile of a stored dataset (or a stored data profile). The suspiciousness score may be based on the similarity metric (e.g., if the similarity metric indicates high similarity, the suspiciousness score may be high).

In some embodiments, honeypot module 341 may be configured to identify unauthorized API calls (e.g., calls from an intruder, a hacker, a malicious actor internal or external to a network). In some embodiments, the unauthorized call may be associated with an authorized user of a computer network (e.g., a malicious actor may use an authorized user's account credentials; an employee may access a computer system for illegitimate purposes, etc.). Identifying unauthorized API calls may include classifying API calls based on at least one of a user account, a log, a failed authentication attempt, a packet sniffing event, a rate of pinging, an Internet Protocol (IP) address, or a media access control (MAC) address.

Honeypot module 341 may include or be configured to train and implement a call-classification model to classify a call as an unauthorized call, consistent with disclosed embodiments. The call-classification model may include a machine-learning model, including a decision tree, an RNN, a CNN, a multilayer perceptron (MLP), or another machine-learning model. The call-classification model may include rule-based models (e.g., a model to detect calls from an unknown location).

For example, honeypot module 341 may be configured to train a call-classification model to detect a suspicious call or suspicious call pattern that differs from normal API call traffic. Honeypot module 341 may be configured to detect a suspicious call. In some embodiments, honeypot module 341 may be configured to identify a location associated with the suspicious call (e.g., an account, an Internet Protocol (IP) address, a media access control (MAC) address, or a uniform resource locator (URL)). In some embodiments, honeypot module 341 may be configured to route a suspicious call or calls from a location associated with the suspicious call to a node-imitating model and/or block calls from a location associated with the suspicious call.

Honeypot module 341 may be configured to determine a call relates to a malicious campaign, consistent with disclosed embodiments. For example, the call may originate from or be associated with a location of a suspicious call or an unauthorized call. The call may have call characteristics that are similar to a suspicious call or an unauthorized call. Call characteristics may include frequency of repeating a call, call content (e.g., requests or commands), or statistical similarities between the call and other call data. In some embodiments, API management system 104 uses a call-classification model to determine a call relates to a malicious campaign.

In some embodiments, honeypot module 341 may be configured to provide information associated with a suspicious call to a client device (e.g., client device 112) and/or an interface (e.g., interface 106). Honeypot module 341 may be configured to receive instructions in response to providing the information. For example, honeypot module 341 may be configured to receive instructions to block a location associated with the suspicious call, monitor activity, and/or route calls to node-imitating models.

Honeypot module 341 may be configured to block a location. Blocking a location may include rejecting calls associated with the location. Blocking a location may include maintaining a blacklist (a list of blocked locations).

Honeypot module 341 may be configured to trace API calls back to the source. This may involve tracking inbound IP calls, outbound IP calls, inbound transmission control protocol (TCP) calls, outbound TCP calls, inbound user datagram protocol (UDP) calls, and/or outbound UDP calls.

Figure 4:
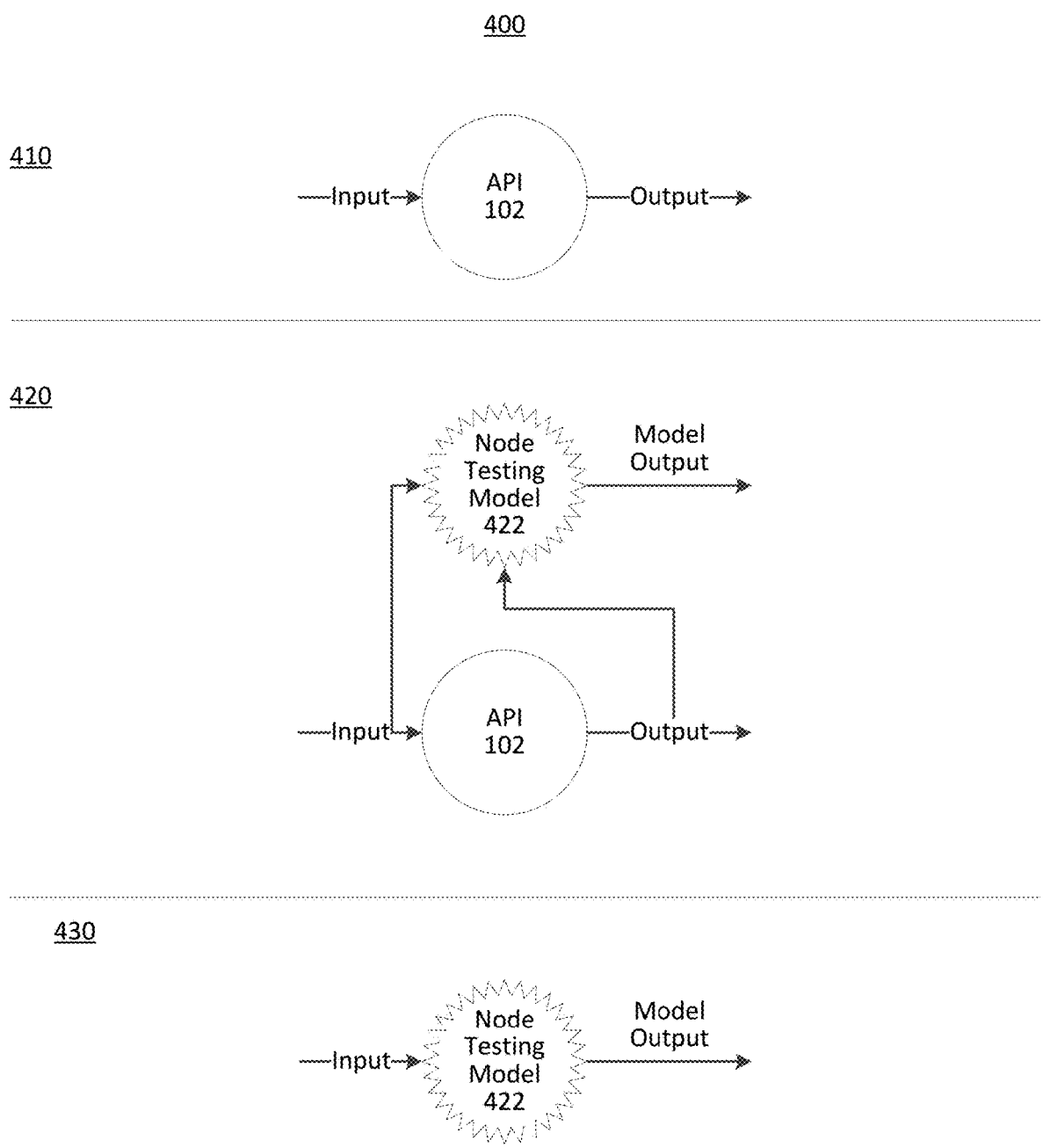
FIG. 4 depicts an exemplary process for training and implementing a node-testing model, consistent with disclosed embodiments.

FIG. 4 depicts an exemplary process for training and implementing a node-testing model, consistent with disclosed embodiments. In some embodiments, API management system 104 performs process 400. One or more of model-training module 336, node-testing module 337, translation module 338, routing module 339, dataset-clustering module 340, or other module of programs 335 may perform operations of process 400, consistent with disclosed embodiments. It should be noted that other components of system 100, including, for example, client device 112 or one or more API systems (e.g., API system 102a, 102b, 102c) may perform one or more steps of process 400.

Consistent with disclosed embodiments, steps of process 400 may be performed on one or more cloud services using one or more ephemeral container instances. For example, at any of the steps of process 400, API management system 104 may generate (spin up) an ephemeral container instance to execute a task, assign a task to an already-running ephemeral container instance (warm container instance), or terminate a container instance upon completion of a task. As one of skill in the art will appreciate, steps of process 400 may be performed as part of an application interface (API) call.

At step 410, API node 102 receives calls (inputs) and produces API outputs based on the calls, consistent with disclosed embodiments. API node 102 may be one of API systems 102a, 102b, 102n, another API system, an API function, an API subroutine, or an API node. API node 102 may comprise sub-components (e.g., other API nodes, functions, routines, subroutines, or the like). At step 410, a call may be received from any component of system 100 or a computing component outside system 100 (e.g., via interface 106). For example, the call may be received from another API node, a client device, a routing module, an API management system, and/or an interface. The call may include an API identifier. The API node processes calls by performing one or more operations in response to the calls. API output may include routing information (e.g., one or more API identifiers specifying a destination for the API output, or an instruction to return an output to a device). API output may include an error message and/or an error code.

At step 420, API management system 104 trains a node-testing model 422, consistent with disclosed embodiments. In some embodiments, API management system 104 may generate node-testing model 422 at step 420. As shown, node-testing model 422 may receive API input (an API call) and API output. API management system 104 may train node-testing model to generate model output that matches the API output. In some embodiments, API management system 104 trains node-testing model 422 until one or more training criteria are satisfied, consistent with disclosed embodiments. For example, a training criterion may be a percent match between model output and API output for a number of API calls.

In some embodiments, model output includes a model result. The model result may include modeled API output (i.e., a possible result of an API call). Modeled API output may include data (e.g., a dataset, synthetic data), descriptions of data (e.g., a data profile, a data schema, a statistical profile, and/or statistical metrics). Modeled API output may include code to use in a call to an API and/or an identifier of an API. For example, modeled API output may include a call for a downstream node associated with the identifier. In some embodiments, the model result may include an error message, a warning message, and/or error code. The model result may include a statement indicating the model result is an unknown result (i.e., the model has not been trained to produce an output based on the call).

In some embodiments, the model output includes a model-result category. The model-result category may indicate a confidence level associated with the model result (e.g., a likelihood that the model result matches API output). The confidence level may include one or more probability vectors associated with particular model outputs based on the model input. The model-result category may indicate whether the model result indicates a success (e.g., the model result includes data and no errors), a possible warning (i.e., the model result includes a warning message), or failure (i.e., the model result includes an error message). As one of skill in the art will appreciate, the model-result category may include any kind of category associated with the call or the model result.

At step 430, API management system 104 implements node-testing model 422. For example, API management system may route real-time API calls to node-testing model 422 in real-time to process API calls and/or may route synthetic or stored API calls to node-testing model 422 (e.g., as depicted in exemplary interface 250 of FIG. 2B). In some embodiments, model output includes a model result and a model-result category.

Figure 5:
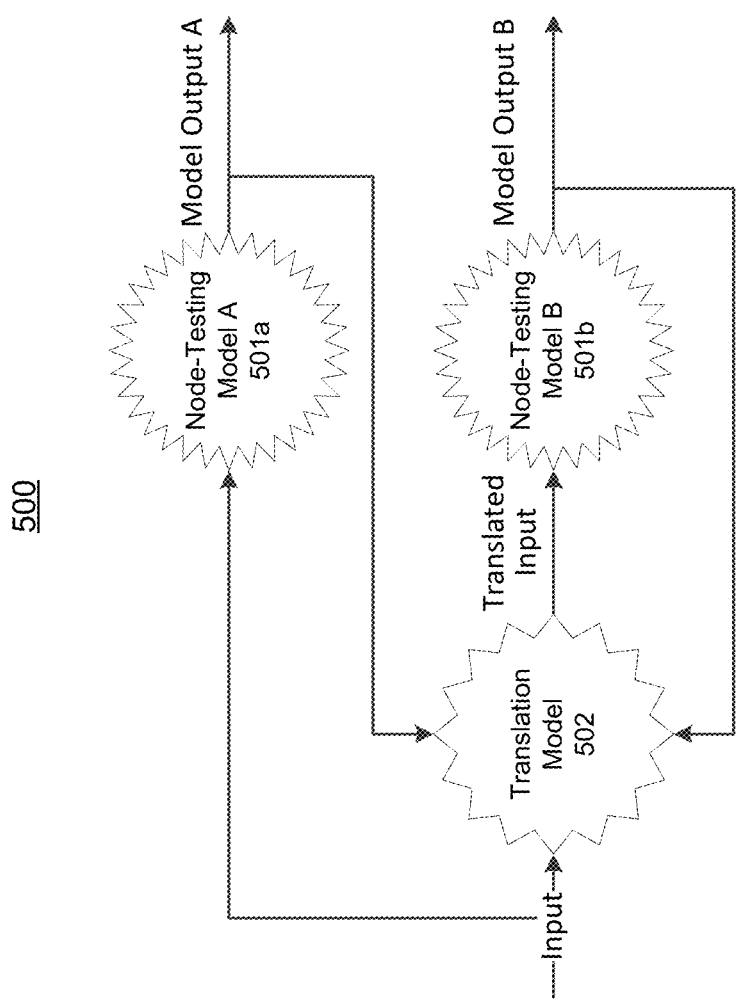
FIG. 5 depicts an exemplary system for training a translation model, consistent with the disclosed embodiments.

FIG. 5 depicts exemplary system 500 for training a translation model, consistent with the disclosed embodiments. As shown in FIG. 5, system 500 includes a translation model 502, a node-testing model A 501*a*, and a node-testing model B 501*b*. Consistent with the disclosed embodiments, translation model 502 may be a translation model implemented by translation module 338. In some embodiments, node-testing model A 501*a* and/or node-testing model B 501*b* may be node-testing models 322, consistent with disclosed embodiments. Node-testing model A 501*a* and node-testing model B 501*b* may be configured to generate model output that simulates the API output of API nodes including a specific version of an API. These nodes may be remote from the translation model training system 500. Therefore, by using node-testing models, system 500 improves efficiency because system 500 does not need to maintain or query the API nodes which the models simulate.

Translation model 502 may be trained to generate translated inputs from inputs, consistent with disclosed embodiments. Training translation model 522 may include passing inputs to node-testing model A 501*a* to produce model outputs A. Training may include passing translated inputs to node-testing model B 501*b* to produce model output B. Training may terminate when a comparison of model output B to model output A satisfies a training criterion. As an example, the criterion may include whether model output B matches model output A, or if model output B matches model output A for a threshold number of matches.

For example, during model training translation model 502 may receive an input, which may include an API call, a dataset, an API response, a model output from another node-testing model, or other input data, such as metadata, identifiers, instructions, a source IP address, a destination IP address, or other additional data. Based on the input it receives, translation model 502 determines an appropriate translated input, which may be sent to node-testing model B 501*b*. Node-testing model B 501*b* may then determine a new model output B, which may be sent to translation model 502.

Translation model 502 may compare the new model output B to an expected model output. The expected model output may include API response, API call, metadata, or anything expected as the output of a system. In some embodiments, the expected model output may be associated with an output expected from a particular API. If translation model 502 determines that that the new model output B does not match the expected model output or is not within a predetermined range of tolerance associated with the expected model output, then translation model 502 may determine that a new translated input should be produced, one that differs from the previously generated translated input. Translation model 502 may then determine a new translated input based on the new model output B and/or the input and model output A, as well as any previously translated inputs or outputs. If translation model 502 determines that the new model output B matches the expected model output, or is within a predetermined range of tolerance associated with the expected model output, then translation model 502 may determine no adjustments are needed, and it may continue to generate its most previous translated input.

In some embodiments, translation model 502 may repeatedly determine successive translated inputs. These repeated translated inputs may be determined based on any inputs and/or outputs received by translation model 502. These inputs and outputs may be associated with current or previous determinations of the translated input by translation model 502. For example, translation model 502 may determine a new translated input based on a previously received input, a previously received model output A, and a newly received model output B, which may have been recently determined by the most previous translated input.

Figure 6:
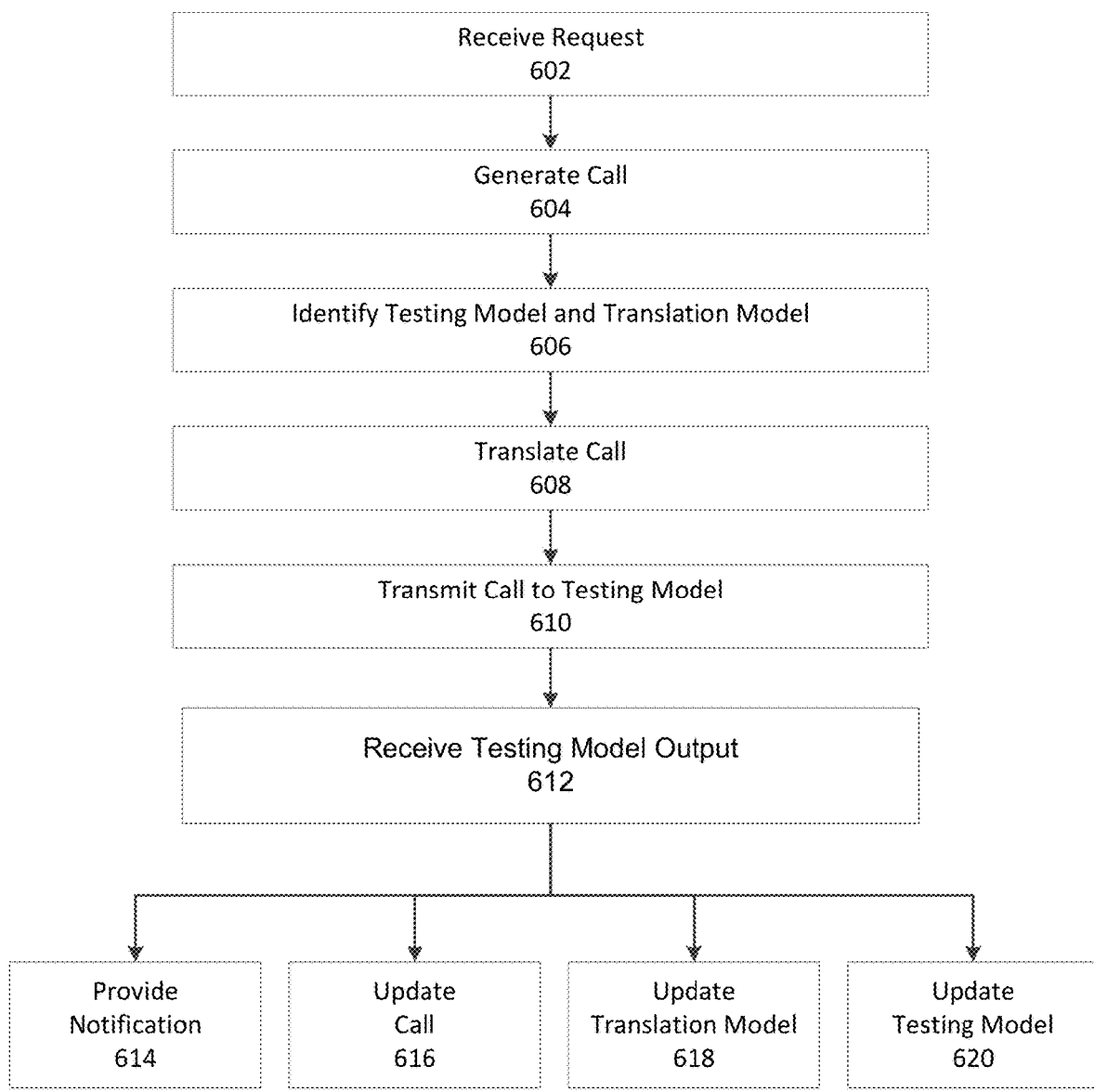
FIG. 6 depicts an exemplary process for managing APIs, consistent with disclosed embodiments.

FIG. 6 depicts exemplary process 600 for managing APIs, consistent with disclosed embodiments. In some embodiments, API management system 104 may perform process 600. One or more of model-training module 336, node-testing module 337, translation module 338, routing module 339, dataset-clustering module 340, and/or honeypot module 341, may perform operations of process 600, consistent with disclosed embodiments. It should be noted that other components of system 100 may perform one or more steps of process 600, including, for example, API systems 102*a*, 102*b*, 102*n* and/or client device 112. Process 600 may be performed based on user inputs or, in some embodiments, process 600 is executed automatically by a program, script, or routine. For example, process 600 may be performed according to a schedule or in response to a triggering event (e.g., following receipt of data at step 602).

At step 602, API management system 104 receives a request, consistent with disclosed embodiments. API management system 104 may receive the request from another component of system 100 or a computing component outside system 100 (e.g., via interface 106). The request may be a request to test one or more API nodes, consistent with disclosed embodiments. The request may include one or more API calls. The request may include instructions to generate one or more synthetic API calls. The instructions may specify characteristics of the API calls. For example, the instructions may specify a range of API call parameters and/or a list of API functions. The request may include one or more API identifiers, routing tables, routing models, and/or information identifying a routing model. The request may include a request to provide model output via a display (e.g., as depicted in interface 250 of FIG. 2B) and/or to store model output.

At step 604, API management system 104 generates one or more API calls, consistent with disclosed embodiments. Generating an API call may include generating the API call based on instructions received at step 602. The API call may include an API identifier.

At step 606, API management system 104 identifies a testing model and/or a translation model, consistent with disclosed embodiments. Identifying a node-testing model may be based on an API identifier. Identifying a node-testing model may be based on a received instruction (e.g., an instruction received at step 602).

At step 608, API management system 104 translates the call, consistent with disclosed embodiments. Translating the call may include identifying an API version associated with the received call and implementing a translation model to generate a translated call associated with another API version. In some embodiments, translating the call includes performing steps of process 800, described in detail below.

At step 610, API management system 104 transmits the call to a node-testing model, consistent with disclosed embodiments. In some embodiments, transmitting the call at step 610 includes transmitting the generated call of step 604 and/or the translated call of step 608.

At step 612, API management system 104 receives node-testing model output, consistent with disclosed embodiments. The node-testing model output may include a model result and/or a model-result category. Following step 612, API management system 104 may perform any of steps 614-620, alone or in combination.

At step 614, API management system 104 provides a notification, consistent with disclosed embodiments. The notification may include a model output. The notification may include a model result and/or a model-result category. In some embodiments, providing the notification includes displaying the notification at an interface (e.g., interface 106). In some embodiments, providing the notification includes transmitting the notification to a client device (e.g., client device 112). In some embodiments, providing the notification includes sending the notification to an enforcement system (e.g., enforcement system 114).

At step 616, API management system 104 updates the call, consistent with disclosed embodiments. Step 616 may include implementing a translation model. Updating the call may include characteristics of the API calls. For example, updating the call may include changing an API call parameter and/or an API function.

At step 618, API management system 104 updates the translation model, consistent with disclosed embodiments. In some embodiments, updating the translation model at step 618 is based on the model-result category. For example, the API management system 104 may transmit a translated call to the node-testing model at step 610 and receive a model-result category at step 612 that indicates that the model result is a failure or an unknown result, trigging modeling training of the translation model.

At step 620, API management system 104 updates the node-testing model, consistent with disclosed embodiments. In some embodiments, updating the node-testing model at step 620 is based on the model-result category. For example, the model-result category of step 612 may indicate that the model result is a failure or an unknown result, trigging model training of the node-testing model.

It should be noted that process 600 may be performed iteratively. For example, following one of steps 614, 616, 618 and/or 620, API management system 104 may again perform step 604 to generate another call based on node-testing model output of step 612. As an illustrative example, API management system 104 may perform process 600 for one or more arrows (API calls) depicted in exemplary interface 250 (FIG. 2B).

Figure 7:
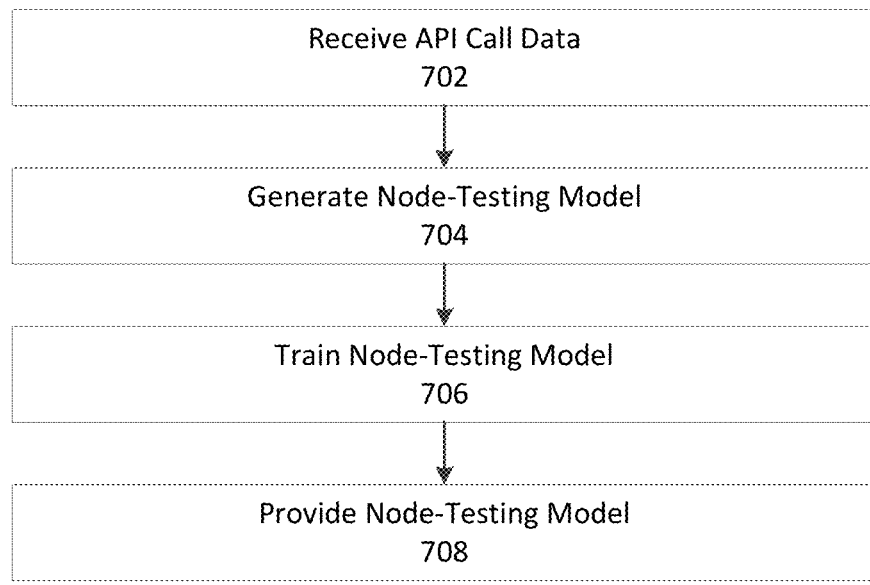
FIG. 7 depicts an exemplary process for training a node-testing model, consistent with disclosed embodiments.

FIG. 7 depicts exemplary process 700 for training a node-testing model, consistent with disclosed embodiments. In some embodiments, API management system 104 may perform process 700. In some embodiments, model-training module 336 performs process 700. One or more of model-training module 336, node-testing module 337, translation module 338, routing module 339, dataset-clustering module 340, and/or honeypot module 341, may perform operations of process 700, consistent with disclosed embodiments. It should be noted that other components of system 100 may perform one or more steps of process 700, including, for example, API systems 102a, 102b, 102n and/or client device 112. Process 700 may be performed based on user inputs or, in some embodiments, process 700 is executed automatically by a program, script, or routine. For example, process 700 may be performed according to a schedule or in response to a triggering event. Process 700 may be performed by an ephemeral container instance, consistent with disclosed embodiments.

At step 702, model-training module 336 receives API call data, consistent with disclosed embodiments. API call data may include API call data API calls, API outputs, and/or API identifiers. Step 702 may include receiving model characteristics and/or training criteria, consistent with disclosed embodiments. For example, received model characteristics may include a model type, a model parameter, a model hyperparameter, a desired outcome, belongingness to a model cluster, and/or belongingness of a model training dataset to a dataset cluster, the similarity of synthetic data generated by a model to actual data, or other characteristics.

At step 704, model-training module 336 generates a node-testing model, consistent with disclosed embodiments. The node-testing model may include a machine learning model, consistent with disclosed embodiments. For example, the node-testing model may include one of an RNN, an LSTM model, or another neural network model. Generating the node-testing model at step 704 may include generating a plurality of model parameters (seeds) to use as starting points for model training. Generating the node-testing model may include retrieving the node-testing model from a data storage (e.g., data 331 or model storage 110). Generating the model may be based on model characteristics received at step 702.

Generating the node-testing model at step 704 may be based on the API call data. For example, the API call data may include an API identifier, and generating the node-testing model may include retrieving a node-testing model previously trained to produce model output that matched API output of an API associated with the identifier.

At step 706, model-training module 336 trains the node-testing model, consistent with disclosed embodiments. Training the model at step 706 may include training the node-testing model until one or more training criteria are satisfied, consistent with disclosed embodiments. For example, a training criterion may be a percent match between node-testing model output and API output for a number of API calls. Training may be based on training criteria received at step 702.

At step 708, model-training module 336 provides the node-testing model, consistent with disclosed embodiments. Providing the model may include transmitting the model to a module of API management system 104; storing the model in a data storage (e.g., data 331, database 110, or other data storage); displaying a graphical representation of the model (e.g., via interface 106); and/or transmitting the model to another component of system 100 (e.g. API system 102a, 102b, 102n and/or client device 112) and/or to a computing component outside system 100 (e.g., via interface 106).

Figure 8:
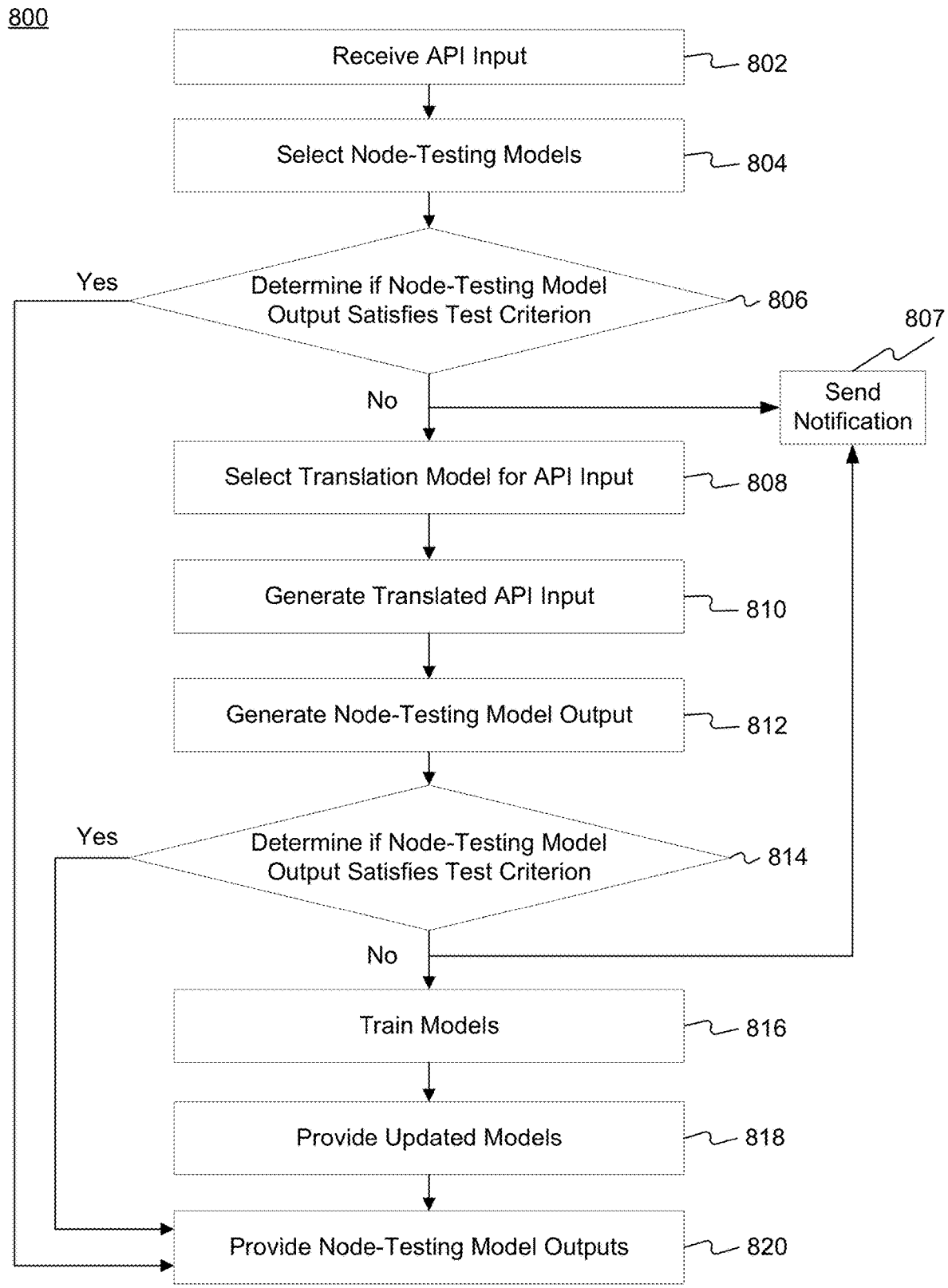
FIG. 8 depicts an exemplary process for testing a translation model, consistent with disclosed embodiments.

FIG. 8 depicts exemplary process 800 for testing a translation model, consistent with disclosed embodiments. In some embodiments, API management system 104 performs process 800. One or more of model-training module 336, node-testing module 337, translation module 338, routing model module 339, dataset-clustering module 340, and/or honeypot module 340 may perform operations of process 800, consistent with disclosed embodiments. It should be noted that other components of system 100, including, for example, client device 112, may perform one or more steps of process 800.

Consistent with disclosed embodiments, steps of process 800 may be performed on one or more cloud services using one or more ephemeral container instances. For example, at any of the steps of process 800, API management system 104 may generate (spin up) an ephemeral container instance to execute a task, assign a task to an already-running ephemeral container instance ("warm container instance"), or terminate a container instance upon completion of a task. Steps of process 800 may be performed using a system for training translation models, such as system 500. As one of skill in the art will appreciate, steps of process 800 may be performed before, after, or alongside an API request and response process. For example, process 800 may be initiated after API management system 104 has become aware that a translation model has produced an output that does not correspond to an API version of a destination API node of the output. After becoming aware of this inaccurate translation, API management system 104 may perform process 800 to update a translation model so that accurate translation may take place, such that the output corresponds to the API version of the destination API node of the output. In other cases, process 800 may be performed following the release of a new API version, in order to keep a translation model functioning effectively.

At step 802, API management system 104 receives input, consistent with disclosed embodiments. The information may be received from, for example, client device 112 and/or via interface 106. The input may have been sent from, for example, a device external to API management system 104 in system 100, or from with API management system 104, such as from another module, which could be testing model module 337. The information may include an API call, API response, a translated input or an output from translation model 502 and/or an API dataset. In some embodiments, the model is a machine learning model. The dataset may include real (actual) data and/or synthetic data, consistent with disclosed embodiments. In some embodiments, the information includes instructions to generate a response to an API call and may include an API identifier, call arguments, or other parameters. In some embodiments, the information includes instructions to retrieve a model and/or a dataset from a data storage (e.g, data 231, model storage 108, and/or database 110).

At step 804, API management system 104 selects one or more node-testing models, consistent with disclosed embodiments. A node-testing model may correspond to an API, consistent with disclosed embodiments. The version of API may be associated with the call. For example, a first selected node-testing model may correspond to the first version of the API, and a second selected node-testing model may correspond to the second version of the API. These node-testing models may be, for example, node-testing model A 501a and/or node-testing model B 501b.

Selecting a node-testing model at step 804 may include retrieving a node-testing model from a data storage (e.g., data 331, database 105). In some embodiments, the selected node-testing models are retrieved based on instructions received at step 802. In some embodiments, step 804 includes generating and/or training a node testing model, consistent with disclosed embodiments.

At step 806, API management system 104 determines if the node-testing models generate model outputs that satisfy a test criterion, consistent with disclosed embodiments. This test criterion may include, for example, a percent match between a model output and an expected model output, or a percent match between a schema of the model output and an expected schema. Determining whether a model output satisfies a test criterion related to a schema may involve using a scheme validation framework, such as Marshmellow, a scheme validation framework that can be implemented using Python. The expected output may include a previous model output generated by API management system 104, and/or a range of desirable model outputs. For example, the expected output may include the model output from the node-testing model corresponding to a first version of an API (e.g., model output A, shown in FIG. 5). In some embodiments, the expected output may include system logs or analytic data. In some embodiments, the logs or analytic data may be unrelated to the input. For example, honeypot module 341 may generate synthetic data, and the logs may be unrelated to the input. In some embodiments, the test criterion includes a determination of whether a distribution of foreign keys and/or data values is within an expected range. For example, the test criterion may be based on a data profile or a statistic metric of API calls, consistent with disclosed embodiments. API management system 104 may also determine if the node-testing models generated model outputs that satisfy a test criterion based on whether an error message is received. In some embodiments, determining whether a model output satisfies a testing criterion may involve determining whether multiple model outputs satisfy a desired distribution related to expected model outputs.

At step 807 API management system 104 sends a notification, consistent with disclosed embodiments. In some embodiments, the notification may be sent via interface 106. In some embodiments, sending the notification includes sending the notification to client device 112. In some embodiments, sending the notification includes displaying the notification at a display of I/O devices 320. The notification may include a warning of changes at an API node, an indication that changes at an API node are breaking changes, an indication of changes detected, and/or possible recommended actions. Recommended actions may include, for example, changing an API version at a node, providing a manual translation, and/or conducting supervised training of a translation model. As shown, step 807 may follow at least one of step 806 and/or step 814 following a determination that a node-testing model output does not satisfy a test criterion.

At step 808, API management system 104 selects a translation model based on the input, consistent with disclosed embodiments. For example, the input may be an API call and the version of the API may be determined. Based on the information associated with the input, an appropriate translation model may be selected. In some embodiments, the translation model may be translation model 502. The translation model may be configured to translate an input, such as an API call, from a first version of an API to a second version of an API. For example, the first version of an API may be the version currently associated with the input, and the second API version may be a version associated with a destination API node. The translation model may be selected using a table that associates APIs and API versions with corresponding translation models, or using a versioning model that associates APIs and their versions with corresponding models. For example, if the input is an API call of a particular version in need of translation, a translation model for translating calls of that version may be selected for testing.

Selecting a translation model at step 808 may include retrieving a node-testing model from a data storage (e.g., data 331, database 105). In some embodiments, the selected translation model may be retrieved based on instructions received at step 802. In some embodiments, step 808 includes generating and/or training a translation model, consistent with disclosed embodiments. Training the translation model may include training the model using API call data associated with a first version of an API and API call data associated a second version of an API, consistent with disclosed embodiments. The API call data may be retrieved from a data storage (e.g., data 331, database 105).

At step 810, API management system 104 generates a translated input based on the received input, using the translation model, consistent with disclosed embodiments. In some embodiments, the translated input may be based on information received at step 802, which may include other inputs or outputs. These may include API calls, API datasets, or other data related to an API.

At step 812, API management system 104 generates one or more model outputs of the selected node-testing models, consistent with disclosed embodiments. In some embodiments, at least one model output may be generated by a node-testing model corresponding to a second version of an API based on the translated input (e.g., as illustrated in model output B of FIG. 5). In some embodiments, at least one model output may be generated by a node-testing model corresponding to a second version of an API based on the input (e.g., as illustrated in model output A of FIG. 5).

At step 814, API management system 104 determines if the model output generated at step 812 satisfies a test criterion, consistent with disclosed embodiments. This test criterion may include, for example, a percent match between a model output corresponding to a second version of an API generated at step 812 and an expected model output, or a percent match between a schema of the model output and an expected schema. In some embodiments, the test criterion includes a determination of whether a distribution of foreign keys and/or data values is within an expected range. For example, the test criterion may be based on a data profile or a statistic metric of API calls, consistent with disclosed embodiments. The expected model output may include a previous output generated by API management system 104, and/or a range of desirable outputs. For example, the expected model output may include the model output from the node-testing model corresponding to a first version of an API (e.g., model output A, shown in FIG. 5). In another example, API management system 104 may see if a key or value of the model output is within a desirable range. In some embodiments, the expected output may include system logs or analytic data. In some embodiments, the logs or analytic data may be unrelated to the input. API management system 104 may also determine if the output generated at step 812 meets a test criterion based on whether an error message is received. In some embodiments, API management system 104 may determine if the model output generated at step 812 meets a test criterion by analyzing how well the model output corresponds to a particular version of an API, which may be associated with an API node that will receive an API output based on the model output. For example, API management system 104 may determine whether the model output has a schema that accords with a particular version of an API, and/or whether the model output will cause an error at a destination node. API management system 104 may determine that no model training is needed if the model output accords with a particular version of an API, or if it does not accord with that version but will not cause an error at a destination node. In some embodiments, determining whether a model output satisfies a testing criterion may involve determining whether multiple model outputs satisfy a desired distribution related to expected model outputs.

At step 816, API management system 104 trains the translation model based on the model output generated at step 812, consistent with disclosed embodiments. In some embodiments, the training may occur if the model output generated at step 812 does not meet the training criterion. Testing may involve an iterative test whereby steps 802-814 are repeated successively, which may involve changing the inputs for some iterations. This iterative test may involve API management system 104 changing rules associated with a translation module 338 that implements the translation model. Repeating steps 802-814 may generate model inputs and/or model outputs that are used only for training purposes, which may be termed intermediate model inputs and intermediate model outputs. Steps 802-814 may be repeated until API management system 104 determines that the model output generated at step 812 satisfies a training criterion. In some embodiments, multiple tests may be run simultaneously. In some embodiments, training the translation model may include producing an updated translation model, which may operate using a translation module 338 that has new rules.

Training the translation model may also trigger API management system 104 to train or generate another translation model. For example, after updating a translation model that translates API calls from a first version to a second version, process 800 may be used to train a translation model that translates API calls from a second version to a first version. Training a translation model may also trigger API management system 104 to train another model, such as one implemented by model training module 336, translation module 338, or routing model module 339. These other models could include a node-testing model. For example, API management system 104 may update node-testing models that were used to train a translation model when the node-testing model produces an error, an unknown result, or a result that does not satisfy a training criterion during translation model training.

At step 818, API management system 104 may provide an updated translation model trained at step 816, consistent with the disclosed embodiments. This may include transmitting the pre-updated model and/or updated model to a module of API management system 104; storing the pre-updated model and/or updated model in a data storage (e.g., data 331, database 110, or other data storage); displaying a graphical representation of the model (e.g., via interface 106); and/or transmitting the pre-updated and/or updated model to another component of system 100 (e.g. API system 102a, 102b, 102n and/or client device 112) and/or to a computing component outside system 100 (e.g., via interface 106). In some embodiments, any pre-updated instances of a model may be discarded after a model is updated.

At step 820, API management system 104 may provide a node-testing model output generated at step 812, consistent with the disclosed embodiments. This may include transmitting the node-testing model output to another translation model 502 and/or a module of API management system 104; storing the node-testing model output in a data storage (e.g., data 331, database 110, or other data storage); displaying a graphical representation of the node-testing model output (e.g., via interface 106); and/or transmitting the node-testing model output to another component of system 100 (e.g. API system 102*a*, 102*b*, 102*n* and/or client device 112) and/or to a computing component outside system 100 (e.g., via interface 106). In some embodiments, any pre-updated instances of a model may be discarded after a model is updated.

Figure 9:
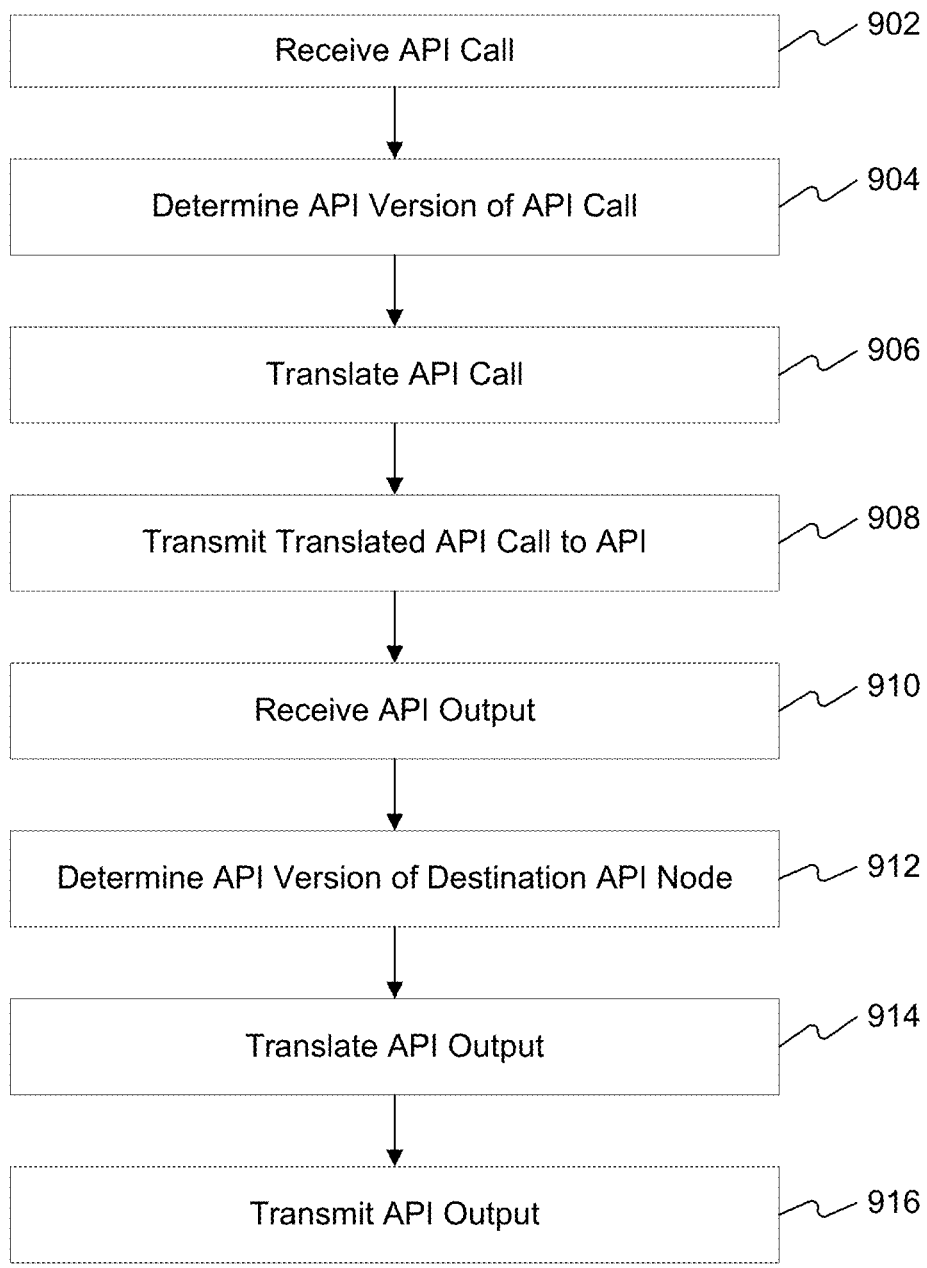
FIG. 9 depicts an exemplary process for implementing a translation model, consistent with disclosed embodiments.

FIG. 9 is a depicts exemplary process 900 for translating an input, consistent with disclosed embodiments. In some embodiments, API management system 104 performs process 900. One or more of model-training module 336, node-testing module 337, translation module 338, routing module 339, dataset-clustering module 340, and/or honeypot module 341, may perform operations of process 700, consistent with disclosed embodiments. It should be noted that other components of system 100, including, for example, client device 112, may perform one or more steps of process 900.

Consistent with disclosed embodiments, steps of process 900 may be performed on one or more cloud services using one or more ephemeral container instances. For example, at any of the steps of process 900, API management system 104 may generate (spin up) an ephemeral container instance to execute a task, assign a task to an already-running ephemeral container instance ("warm container instance"), or terminate a container instance upon completion of a task. As one of skill in the art will appreciate, steps of process 900 may be performed as part of processing an API call.

At step 902, API management system 104 receives an API call, consistent with disclosed embodiments. This API call may be received from model-training module 336, testing model module 337, translation model module 338, routing model module 339, dataset-clustering module 340, honeypot module 341, or other components of system 100, including, for example, client device 112. API management system 104 may receive other input with the API call, such as an API dataset, API response, model output from another node-testing model, or other input data, such as metadata, identifiers, instructions, system logs, analytic data, or other additional data.

At step 904, API management system 104 determines the API version of the API call received at step 902, consistent with disclosed embodiments. This determination may be based on an API identifier contained in the API call. After determining the API version, API management system 104 may determine an appropriate model to use for translating the API call. The model may be selected using a table that associates APIs and API versions with corresponding models, or using a separate model that associates APIs and their versions with corresponding models, as in step 804.

At step 906, API management system 104 translates the API call. In some embodiments, translating the API call includes using a translation model as described in translation module 338. For example, if the API call is associated with a first version of an API and it has a destination node with a second version of an API, API management system 104 may translate the API call from the first version to the second version.

At step 908, API management system 104 transmits the translated API call, consistent with disclosed embodiments. Transmitting the translated API call may include transmitting the translated API call to an API node. In some embodiments, API management system 104 may transmit the translated API call to any of programs 335, to another part of API management system 104, or to another component of system 100. Transmitting the translated call may include storing the received and/or translated call in a data storage (e.g., database 110, data 331). In some embodiments, calls, responses, and other API inputs and outputs may be stored as part of a dataset, which may be stored in a data storage (e.g., database 110, data 331). Such datasets may be used to train models, for example, by using process 700.

At step 910, API management system 104 receives an API output from an API node, consistent with disclosed embodiments. The API output may have been generated based on the translated API. For example, the API output may include a result generated by an API in response to the translated API call transmitted by API management system 104.

At step 912, API management system 104 determines an API version associated with a destination API node, consistent with disclosed embodiments. The destination API node may be the next node to which the output will be transmitted, which may be the same API node from which the API call was received at step 902 (i.e., a source node). In some embodiments, API management system 104 may determine that the API version of the API output is not the same as the API version of the as a destination API node, and that this incompatibility may produce an error at an API node. The API version of the destination API node may be determined from information contained in the API call. In some embodiments, the API version of the destination API node may be the same as the API version of the API call determined at step 904.

At step 914, API management system 104 translates the API output, consistent with disclosed embodiments. For example, API management system 104 may translate an API output configured for one version of an API to an API output configured for a different version of an API. The different version may be one used by a node that may receive the API output.

At step 916, API management system 104 transmits the translated API output, consistent with disclosed embodiments. In some embodiments, the translated API output may be transmitted to the API node from which the API call was received at step 902. For example, the source API node may be part of a user device that sent the API call at step 902. In some embodiments, the translated API output may be transmitted to another API node. In some embodiments, the translated API output may be transmitted to another part of API management system 104, another component of system 100 (e.g., one of API systems 102*a*, 102*b*, 102*c*), and/or or a computing component outside system 100 (e.g., via interface 106).

Figure 10:
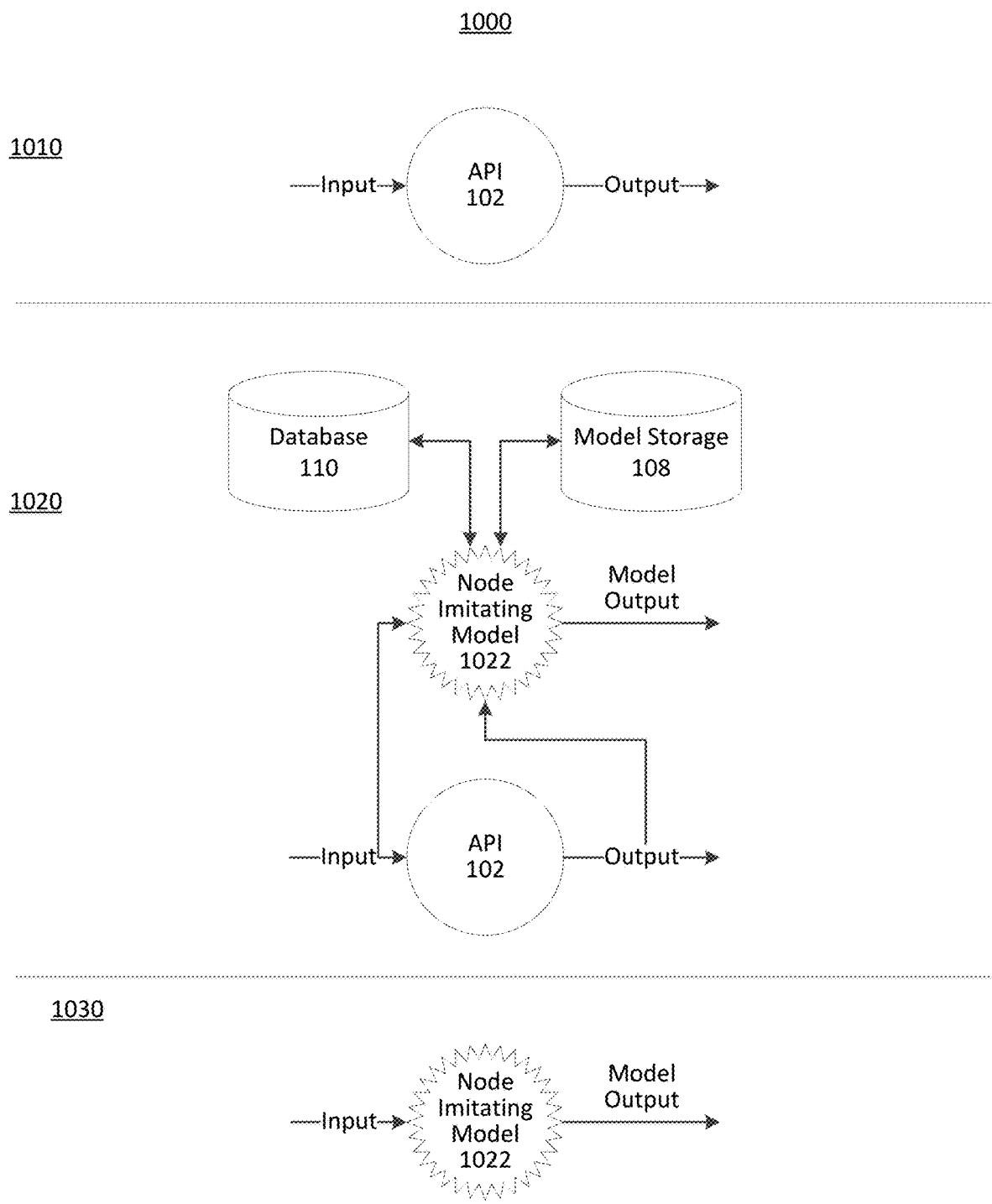
FIG. 10 depicts an exemplary process for training and implementing a node-imitating model, consistent with disclosed embodiments.

FIG. 10 depicts exemplary process 1000 for training and implementing a node-imitating model, consistent with disclosed embodiments. In some embodiments, API management system 104 performs process 1000. One or more of model-training module 336, node-testing module 337, translation module 338, routing module 339, dataset-clustering module 340, and/or honeypot module 341 may perform operations of process 1000, consistent with disclosed embodiments. Process 1000 may be performed based on user inputs or, in some embodiments, process 1000 is executed automatically by a program, script, or routine. For example, process 1000 may be performed according to a schedule or in response to a triggering event. It should be noted that other components of system 100, including, for example, client device 112 or one or more API systems (e.g., API system 102a, 102b, 102c) may perform one or more steps of process 1000.

Consistent with disclosed embodiments, steps of process 1000 may be performed on one or more cloud services using one or more ephemeral container instances. For example, at any of the steps of process 1000, API management system 104 may generate (spin up) an ephemeral container instance to execute a task, assign a task to an already-running ephemeral container instance (warm container instance), or terminate a container instance upon completion of a task. As one of skill in the art will appreciate, steps of process 1000 may be performed as part of an application interface (API) call.

At step 1010, API node 102 receives calls (inputs) and produces API outputs based on the calls as previously described in relation to step 410, consistent with disclosed embodiments.

At step 1020, API management system 104 trains a node-imitating model 1022, consistent with disclosed embodiments. In some embodiments, API management system 104 may generate node-imitating model 1022 at step 1020. Generating and/or training node-imitating model 1022 may be based on data received or retrieved from model storage 108, including one or more models, model characteristics, and/or training criteria. Node-imitating model 1022 may be configured to retrieve and/or receive data from database 110, including one or more datasets. In some embodiments, training node-imitating model 1022 may include receiving a node-testing model (e.g., node-testing model 422) from a data storage (e.g., model storage 108) and training the node-testing model.

API management system 104 may train node-imitating model 1022 to generate model output based on the API output. In some embodiments, training node-imitating model 1022 to generate model output include training the model to generate synthetic data. The synthetic data may satisfy a similarity metric when compared to the API output. In some embodiments, model output of node-imitating model 1022 may include a data marker, consistent with disclosed embodiments.

API management system 104 may train node-imitating model 1022 to generate model output having a predetermined data profile. For example, the predetermined data profile may be based on one or more data markers (e.g., node-imitating model 1022 may generate data with two data markers having a predetermined covariance between data columns).

At step 1030, API management system 104 implements node-imitating model 1022. For example, API management system may route real-time API calls to node-imitating model 1022 to process API calls.

Figure 11:
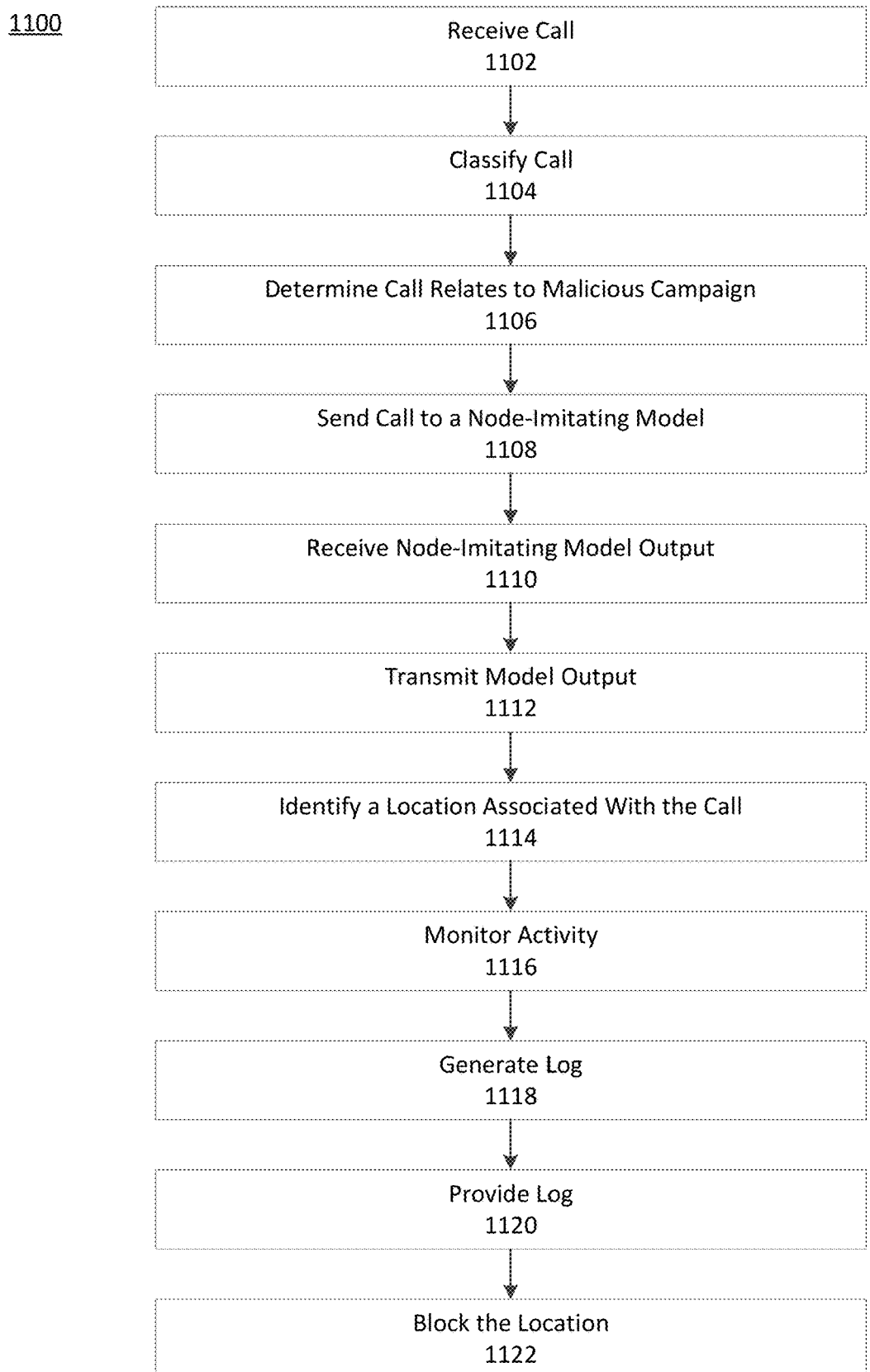
FIG. 11, depicts an exemplary process for managing unauthorized API calls, consistent with disclosed embodiments.

FIG. 11, depicts exemplary process 1100 for managing unauthorized API calls, consistent with disclosed embodiments. In some embodiments, API management system 104 may perform process 1100. One or more of model-training module 336, node-testing module 337, translation module 338, routing module 339, dataset-clustering module 340, and/or honeypot module 341, may perform operations of process 1100, consistent with disclosed embodiments. It should be noted that other components of system 100 may perform one or more steps of process 1100, including, for example, API systems 102a, 102b, 102n and/or client device 112. Process 1100 may be performed based on user inputs or, in some embodiments, process 1100 is executed automatically by a program, script, or routine. For example, process 1100 may be performed according to a schedule or in response to a triggering event. Process 1100 may be performed by an ephemeral container instance, consistent with disclosed embodiments.

At step 1102, API management system 104 receives a call, consistent with disclosed embodiments. Receiving the call may include receiving the call from a client device (e.g., client device 112) or a computing component outside system 100. Receiving a call may include receiving the call from an API node (e.g., one of API systems 102a, 102b, or 102n, or a component of one of the API systems). For example, the call may be a call between nodes of different routing layers as depicted in exemplary interface 250 of FIG. 2B.

At step 1104, API management system 104 classifies the call, consistent with disclosed embodiments. Classifying the call may include using a call-classification model, as described above. In some embodiments, the call may be classified as one of authorized, suspicious, unauthorized, or another call class. Classifying the call may be based on a user account, a log, a failed authentication attempt, a packet sniffing event, a rate of pinging, an IP address, and/or a MAC address.

At step 1106, API management system 104 determines whether the call relates to a malicious campaign, consistent with disclosed embodiments. In some embodiments, determining that the call relates to a malicious campaign includes determining that call characteristics are similar to one or more suspicious calls and/or one or more unauthorized calls. In some embodiments, API management system 104 uses a call-classification model to determine a call relates to a malicious campaign.

At step 1108, API management system 104 sends the call to a node-imitating model, consistent with disclosed embodiments. In some embodiments, step 1108 includes generating or training a node-imitating model, consistent with disclosed embodiments. It should be noted that, before or after step 1108, API management system 104 may continue to route legitimate or authorized call to API nodes or may generate new API nodes (e.g., a secondary live system) to manage legitimate API calls.

At step 1110, API management system 104 receives model output of the node-imitating model, consistent with disclosed embodiments. As previously described in reference to honeypot module 341, model output of the node-imitating model may include synthetic data based on API output.

At step 1112, API management system 104 transmits model output and/or information based on the model output, consistent with disclosed embodiments. Transmitting at step 1112 may include transmitting to a location associated with the call. Transmitting at step 1112 may include transmitting the model output or information based on the model output to a second node-imitating model. For example, if the model output includes a call to a downstream API node, step 1112 may include repeating steps 1108 and 1110. Steps 1108 through 1112 may be repeated any number of times. Repeating steps 1108 through 1112 may include operations performed by routing module 339 (e.g., identifying downstream API nodes associated with an API call, using a routing table, and/or using a routing model).

At step 1114, API management system 104 identifies a location associated with the call, consistent with disclosed embodiments. The location may include an account, an IP address, a MAC address, a URL, or the like.

At step 1116, API management system 104 monitors activity, consistent with disclosed embodiments. Monitoring activity may include classifying future calls (e.g., using a call-classification model), routing calls associated with the location to a node-imitating model, and/or comparing new calls to the call received at step 1102. Step 1116 may include determining, based on the comparison, that a new call is relates to the call receive at step 1102.

At step 1118, API management system 104 generates a log, consistent with disclosed embodiments. In some embodiments, the log includes information associated with the received call (e.g., the location; a timestamp; a classification as authorized, unauthorized, or suspicious). In some embodiments, the log includes information associated with the monitoring of step 1116.

At step 1120, API management system 104 provides the log, consistent with disclosed embodiments. Providing the log may include displaying the log in an interface (e.g., interface 106). Providing the log may include transmitting the log to another component of system 100 (e.g., client device 112; enforcement system 114) and/or or a computing component outside system 100 (e.g., via interface 106).

At step 1122, API management system 104 blocks the location, consistent with disclosed embodiments. Blocking the location may include updating a blacklist.

Figure 12:
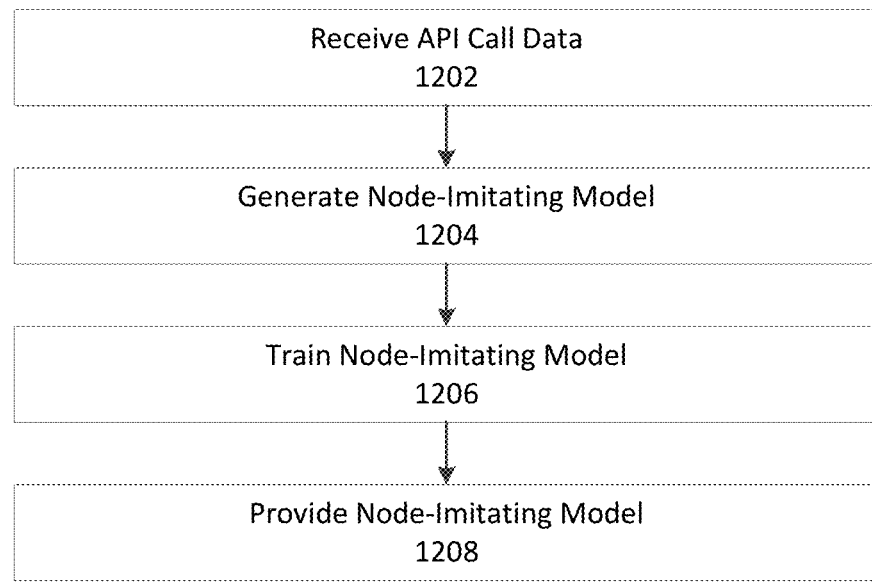
FIG. 12 depicts an exemplary process for training a node-imitating model, consistent with disclosed embodiments.

FIG. 12 depicts exemplary process 1200 for training a node-imitating model, consistent with disclosed embodiments. In some embodiments, API management system 104 may perform process 1200. One or more of model-training module 336, node-testing module 337, translation module 338, routing module 339, dataset-clustering module 340, and/or honeypot module 341, may perform operations of process 1200, consistent with disclosed embodiments. It should be noted that other components of system 100 may perform one or more steps of process 1200, including, for example, API systems 102a, 102b, 102n and/or client device 112. Process 1200 may be performed based on user inputs or, in some embodiments, process 1200 is executed automatically by a program, script, or routine. For example, process 1200 may be performed according to a schedule or in response to a triggering event. Process 1200 may be performed by an ephemeral container instance, consistent with disclosed embodiments.

At step 1202, model-training module 336 receives API call data, consistent with disclosed embodiments. API call data may include API call data API calls, API outputs, and/or API identifiers. Step 1202 may include receiving model characteristics and/or training criteria, consistent with disclosed embodiments. For example, received model characteristics may include a model type, a model parameter, a model hyperparameter, a desired outcome, belongingness to a model cluster, and/or belongingness of a model training dataset to a dataset cluster, the similarity of synthetic data generated by a model to actual data, or other characteristics.

At step 1204, model-training module 336 generates a node-implementing model, consistent with disclosed embodiments. The node-implementing model may include a machine-learning model, consistent with disclosed embodiments. For example, the node-implementing model may include one of an RNN, an LSTM model, a seq2seq model, a CNN, a GAN, an autoencoder, or another neural network model. Generating the node-implementing model at step 1204 may include generating a plurality of model parameters (seeds) to use as starting points for model training. Generating the node-implementing model may include retrieving a node-testing model or a node-implementing model from a data storage (e.g., data 331 or model storage 110). Generating the node-implementing model may be based on model characteristics received at step 1202.

Generating the node-implementing model at step 1204 may be based on the API call data. For example, the API call data may include an API identifier, and generating the node-implementing model may include retrieving a node-implementing model previously trained to produce model output that matched API output of an API associated with the identifier.

At step 1206, model-training module 336 trains the node-implementing model, consistent with disclosed embodiments. Training the model at step 1206 may include training the node-implementing model until one or more training criteria are satisfied, consistent with disclosed embodiments. Training may be based on training criteria received at step 1202. In some embodiments, training includes training the node-implementing model to generate synthetic data. The synthetic data may satisfy a similarity metric when compared to the API output. In some embodiments, model output of the node-imitating model may include a data marker, consistent with disclosed embodiments At step 1208, model-training module 336 provides the node-implementing model, consistent with disclosed embodiments. Providing the model may include transmitting the model to a module of API management system 104; storing the model in a data storage (e.g., data 331, database 110, or other data storage); displaying a graphical representation of the model (e.g., via interface 106); and/or transmitting the model to another component of system 100 (e.g. API system 102a, 102b, 102n and/or client device 112) and/or to a computing component outside system 100 (e.g., via interface 106).

Figure 13:
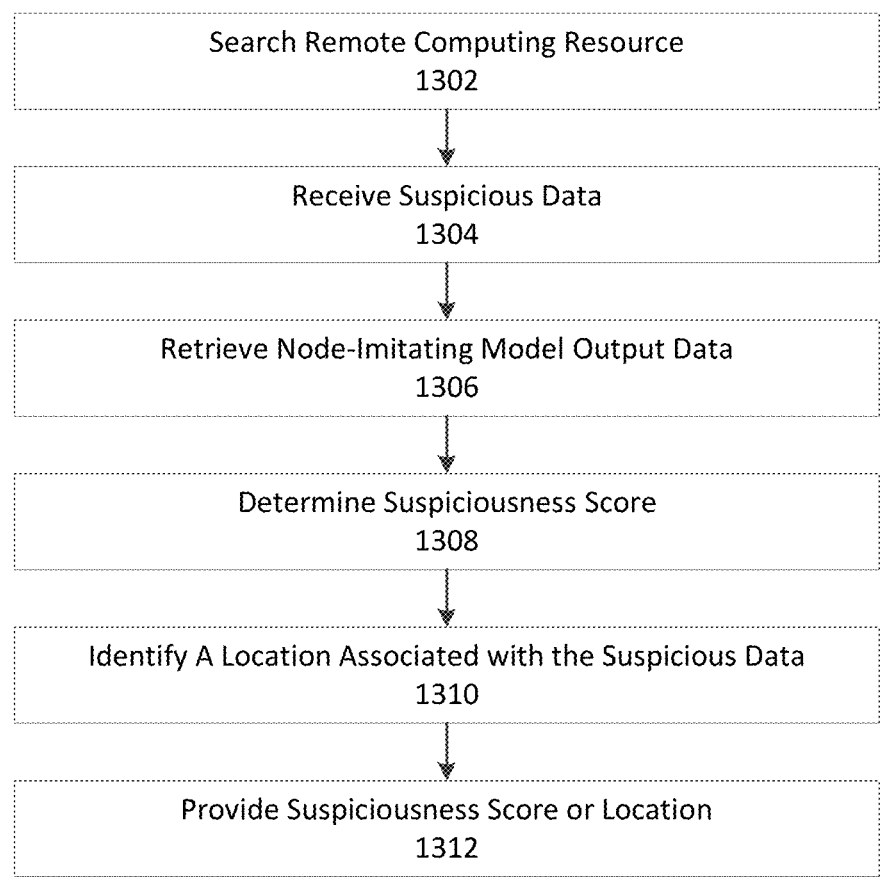
FIG. 13 depicts an exemplary process for identifying suspicious data, consistent with disclosed embodiments.

FIG. 13 depicts exemplary process 1300 for identifying suspicious data, consistent with disclosed embodiments. In some embodiments, API management system 104 may perform process 1300. One or more of model-training module 336, node-testing module 337, translation module 338, routing module 339, dataset-clustering module 340, and/or honeypot module 341, may perform operations of process 1300, consistent with disclosed embodiments. It should be noted that other components of system 100 may perform one or more steps of process 1300, including, for example, API systems 102a, 102b, 102n and/or client device 132. Process 1300 may be performed based on user inputs or, in some embodiments, process 1300 is executed automatically by a program, script, or routine. For example, process 1300 may be performed according to a schedule or in response to a triggering event. Process 1300 may be performed by an ephemeral container instance, consistent with disclosed embodiments.

At step 1302, API management system 104 searches a remote computing resource, consistent with disclosed embodiments. Searching the remote computer resource may include searching a network (e.g., a virtual private network, the internet, or any other network). Searching the remote computing resource may include searching a database. Searching the remote computing resource may include searching enforcement system 114. Searching the remote computing resource at step 1302 may include searching for a data marker. Searching the remote computing resource at step 1302 may include searching for a dataset At step 1304 API management system 104 receives suspicious data, consistent with disclosed embodiments. The suspicious data may include a dataset. In some embodiments, the suspicious data may be received in a request from a client device 112 or enforcement system 114. In some embodiments, the suspicious data may be received in response to the searching (e.g., as a download, a search result, or a file transmission).

At step 1306, API management system 104 retrieves model output from one or more node-imitating models, consistent with disclosed embodiments. Retrieving model output may include retrieving a data marker and/or a data profile.

At step 1308, API management system 104 determines a suspiciousness score of the data, consistent with disclosed embodiments. In some embodiments, the suspiciousness score is a likelihood that the data derives from API calls to an API node (e.g. API systems 102a, 102b, 102n or their components) and/or API management system 104. In some embodiments, the suspiciousness score is based on detecting a data marker in the suspicious data. For example, the suspiciousness score may be based on a frequency of the data marker in a dataset. The data marker may be a data marker retrieved at step 1306.

In some embodiments, the suspiciousness score is based on a data profile of the suspicious data. For example, step 1308 may include determining a similarity metric of a data profile of a dataset of the suspicious data and a data profile of a stored dataset (or a stored data profile). The suspiciousness score may be based on the similarity metric (e.g., if the similarity metric indicates high similarity, the suspiciousness score may be high). The data profile of a dataset of the suspicious data may be received (e.g. at step 1304) or determined by API management system 104 (as described above). The stored dataset and/or stored data profile may be stored, for example, in one of data 331 or database 110. The stored dataset and/or stored data profile may be retrieved at step 1306.

At step 1310, API management system 104 identifies a location associated with the suspicious data, consistent with disclosed embodiments. The location may be received at step 1304. The location may be identified based on a call tracing.

At step 1312, API management system 104 provides the suspiciousness score or location, consistent with disclosed embodiments. Providing the suspiciousness score may include displaying the suspiciousness score in an interface (e.g., interface 106). Providing the suspiciousness score may include transmitting the suspiciousness score to another component of system 100 (e.g., client device 112; enforcement system 114) and/or or a computing component outside system 100 (e.g., via interface 106).

Systems and methods disclosed herein involve unconventional improvements over conventional approaches to managing APIs. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein. It should be noted that client device 112 and/or one or more of API system 102a, 102b, 102n may perform any of the features or steps described above in regard to API management system 104 in reference to the various embodiments and processes.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various functions, scripts, programs, or modules can be created using a variety of programming techniques. For example, programs, scripts, functions, program sections or program modules can be designed in or by means of languages, including JAVASCRIPT, C, C++, JAVA, PHP, PYTHON, RUBY, PERL, BASH, or other programming or scripting languages. One or more of such software sections or modules can be integrated into a computer system, non-transitory computer-readable media, or existing communications software. The programs, modules, or code can also be implemented or replicated as firmware or circuit logic.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for managing application programming interfaces (APIs), comprising:
   one or more memory units storing instructions; and
   one or more processors configured to execute the instructions to perform operations comprising:
      training a first node-testing model corresponding to a first API node based on first API call data and a first indicator of a match between first node-testing model output and first API node output;
      training a second node-testing model corresponding to a second API node based on second API call data and a second indicator of a match between second node-testing model output and second API node output;
      training a translation model to generate a translated input based on a plurality of inputs, the first node-testing model output, and the second node-testing model output;
      sending, using a routing module, a call to the first node-testing model;
      generating, by the first node-testing model, a first model result and a first model-result category based on the call, the first model-result category comprising an estimate of a likelihood that the first model result matches a result of the first API node;
      identifying, using the routing module, the second node-testing model based on the first model result;
      generating, by the translation model, a translated model result based on the first node-testing model result;
      sending, using the routing module, the translated model result to the second node-testing model based on the identification of the second node-testing model;
      generating, by the second node-testing model, a second model result and a second model-result category based on the translated model result, the second model-result category comprising an estimate of a likelihood that the second model result matches a
result of the second API node;
determining that at least one of:
the first model result comprises a first warning
message,
the first model result comprises a first error message,
the second model result comprises a second warning
message, or
the second model result comprises a second error
message;
displaying, at an interface, a message based on at least
one of the first model-result category or second
model-result category; and
displaying, at the interface, at least one of the first
warning message, first error message, second warning message, or second error message.

2. The system of claim 1, wherein at least one of the first or second indicator is a percent match between first node-testing model output and first API node output.

3. The system of claim 1, wherein at least one of the first or second indicator is a confidence level.

4. The system of claim 3, wherein: the call comprises an API identifier; and sending the call is based on the API identifier.

5. The system of claim 1, the operations further comprising:
receiving user inputs from the interface; and
based on the user inputs, performing at least one of generating an updated first node-testing model or generating an updated second node-testing model.

6. The system of claim 1, the operations further comprising:
training a translation model to generate a translated input based on a plurality of inputs, and first node-testing model output; and
generating, by the translation model, a translated call based on the call,
wherein generating first node-testing model output is based on the translated call.

7. The system of claim 1, wherein at least one of sending the call or sending the first model result is based on a routing table.

8. The system of claim 1, wherein:
the operations further comprise training a routing model to identify pathways in a network of APIs comprising the first API node and the second API node; and
at least one of sending the call or sending the first model result is based on output of the routing model.

9. The system of claim 1, wherein the first node-testing model comprises at least one of a sequence-to-sequence model (seq2seq), a recurrent neural network mode (RNN), a long-short term memory (LSTM) model, or a convolutional neural network (CNN).

10. The system of claim 1, the operations further comprising displaying, at the interface, a plurality of routing pathways between a plurality of node-testing models, the node-testing models comprising the first node-testing model and second node-testing model.

11. The system of claim 1, wherein at least one of training the first node-testing model or training the second node-testing model comprises hyperparameter tuning.

12. The system of claim 1, wherein:
the operations further comprise identifying, using the routing module, the first node-testing model of the node-testing models based on the call; and
sending the call is based on identifying the first node-testing model.

13. The system of claim 1, wherein:
the first model result comprises an API identifier; and
sending the first model result is based on the API identifier.

14. The system of claim 1, the operations further comprising:
training a third node-testing model corresponding to a third API node based on third API call data and a third indicator of a match between third node-testing model output and third API node output;
identifying, by the routing module, the third node-testing model based on the second model result;
sending, using the routing module, the second model result to the third node-testing model based on the identification of the third node-testing model;
generating, by the third node-testing model, a third model result and a third model-result category based on the second model result, the third model-result category comprising an estimate of a likelihood that the third model result matches a result of the third API node.

15. The system of claim 1, wherein:
the first model-result category comprises an unknown result; and
the operations further comprise training the first node-testing model based on the call, the API call data, and the first indicator.

16. The system of claim 1, wherein:
the second model-result category comprises an unknown result; and
the operations further comprise training the second node-testing model based on the call, the API call data, and the second indicator.

17. The system of claim 1, wherein the system comprises a cloud service.

18. A method for managing application programming interfaces (APIs), comprising:
training a first node-testing model corresponding to a first API node based on first API call data and a first indicator of a match between first node-testing model output and first API node output;
training a second node-testing model corresponding to a second API node based on second API call data and a second indicator of a match between second node-testing model output and second API node output;
training a translation model to generate a translated input based on a plurality of inputs, the first node-testing model output, and the second node-testing model output;
sending, using a routing module, a call to the first node-testing model;
generating, by the first node-testing model, a first model result and a first model-result category based on the call, the first model-result category comprising an estimate of a likelihood that the first model result matches a result of the first API node;
identifying, using the routing module, the second node-testing model based on the first model result;
generating, by the translation model, a translated model result based on the first node-testing model result;
sending, using the routing module, the translated model result to the second node-testing model based on the identification;
generating, by the second node-testing model, a second model result and a second model-result category based on the translated model result, the second model-result category comprising an estimate of a likelihood that the second model result matches a result of the second API node;

determining that at least one of:
the first model result comprises a first warning message,
the first model result comprises a first error message,
the second model result comprises a second warning message, or the second model result comprises a second error message;

displaying, at an interface, a message based on at least one of the first model-result category or second model-result category; and displaying, at the interface, at least one of the first warning message, first error message, second warning message, or second error message.

19. A system for managing application programming interfaces (APIs), comprising:
one or more memory units storing instructions; and
one or more processors configured to execute the instructions to perform operations comprising:
training a plurality of node-testing models corresponding to a plurality of API nodes based on API call data and indicators of a match between output of the node-testing models and output of the corresponding API nodes;
training a translation model to generate a translated input based on a plurality of inputs, first node-testing model output, and second node-testing model output;
identifying, using a routing module, a first node-testing model of the node-testing models based on a call;
sending, using the routing module, the call to the first node-testing model;
generating, by the first node-testing model, a first model result and a first model-result category based on the call, the first model-result category comprising an estimate of a likelihood that the first model result matches a result of a first API node of the API nodes, the first API node corresponding to the first node-testing model;
identifying, using the routing module, a second node-testing model of the node-testing models based on the first model result;
generating, by the translation model, a translated model result based on the first node-testing model result;
sending, using the routing module, the translated model result to the second node-testing model based on the identification;
generating, by the second node-testing model, a second model result and a second model-result category based on the translated model result, the second model-result category comprising an estimate of a likelihood that the second model result matches a result of a second API node of the API nodes, the second API node corresponding to the second node-testing model;
determining that at least one of:
the first model result comprises a first warning message,
the first model result comprises a first error message,
the second model result comprises a second warning message, or
the second model result comprises a second error message;

displaying, at an interface, a message based on at least one of the first model-result category or second model-result category; and displaying, at the interface, at least one of the first warning message, first error message, second warning message, or second error message.

\* \* \* \* \*